(12) United States Patent
Neal, Jr. et al.

(10) Patent No.: US 11,897,527 B2
(45) Date of Patent: Feb. 13, 2024

(54) AUTOMATED POSITIVE TRAIN CONTROL EVENT DATA EXTRACTION AND ANALYSIS ENGINE AND METHOD THEREFOR

(71) Applicant: BNSF Railway Company, Fort Worth, TX (US)

(72) Inventors: Scott Alan Neal, Jr., Fort Worth, TX (US); Siju Pallimolel Kuriakose, Bedford, TX (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 18/065,149

(22) Filed: Dec. 13, 2022

(65) Prior Publication Data

US 2023/0331266 A1    Oct. 19, 2023

Related U.S. Application Data

(63) Continuation of application No. 17/721,204, filed on Apr. 14, 2022, now Pat. No. 11,541,919.

(51) Int. Cl.
*B61L 3/00* (2006.01)
*B60T 8/17* (2006.01)

(52) U.S. Cl.
CPC ............ *B61L 3/006* (2013.01); *B60T 8/1705* (2013.01); *B61L 3/002* (2013.01)

(58) Field of Classification Search
CPC ......... B61L 3/006; B61L 3/002; B60T 8/1705
See application file for complete search history.

(56) References Cited

U.S. PATENT DOCUMENTS

| 8,082,071 B2 | 12/2011 | Daum et al. |
| 9,796,400 B2 | 10/2017 | Puttagunta et al. |
| 10,077,033 B2 | 9/2018 | Oswald et al. |

(Continued)

FOREIGN PATENT DOCUMENTS

| EP | 3254928 A1 | 12/2017 |
| EP | 3753801 A1 | 12/2020 |
| WO | 2020205684 A1 | 10/2020 |

OTHER PUBLICATIONS

Hann, Greg. "Incremental train control system." IEEE Vehicular technology magazine 5.4 (2010): 50-55. (Year: 2010).*

(Continued)

*Primary Examiner* — Russell Frejd
(74) *Attorney, Agent, or Firm* — Whitaker Chalk Swindle & Schwartz, PLLC; Enrique Sanchez, Jr.

(57) ABSTRACT

A system and method for automating workflow and performing root cause analysis for enforcement events is presented. The system can enable accurate detection of an enforcement event and identifies the root cause of such events. The system can provide a user with an interface to monitor the enforcement event by collecting a list of data characterizing the enforcement event, as well as analyze the data to evaluate what is the root cause of the enforcement event. The system can extract critical information from train system logs of the train using an extraction model to generate a window of activity providing an analysis model with a comprehensive scope to analyze the enforcement event. The system can give the user robust and accurate information of the root cause of the enforcement event.

20 Claims, 10 Drawing Sheets

(56) References Cited

U.S. PATENT DOCUMENTS

| | | |
|---|---|---|
| 11,538,076 B1 | 12/2022 | McCormick |
| 2014/0218482 A1 | 8/2014 | Prince |
| 2016/0194012 A1 | 7/2016 | Matthews et al. |
| 2018/0339719 A1 | 11/2018 | Loughlin |
| 2021/0107359 A1 | 4/2021 | Howard et al. |
| 2022/0194440 A1* | 6/2022 | Akif .................... B61L 27/40 |

OTHER PUBLICATIONS

Smallcombe, Mark. "Using Regular Expression in Big Data". Intefrate.io. Sep. 28, 2020. (Year: 2020).*

Wen, Chao, et al. "Train dispatching management with data-driven approaches: A comprehensive review and appraisal." IEEE Access 7 (2019): 114547-114571. (Year: 2019).*

Chowdhury, Rahul, et al. "Regular expressions in big data analytics." 2017 International Conference on Intelligent Computing and Control (I2C2). IEEE, 2017. (Year: 2017).*

Zhao, Yanbo, and Petros Ioannou. "Positive train control with dynamic headway based on an active communication system." IEEE Transactions on intelligent transportation systems 16.6 (2015): 3095-3103. (Year: 2015).*

Zhao et al., Positive Train Control With Dynamic Headway Based on an Active Communication System, pp. 3095-3103, vol. 16, No. 6, 2015.

Shuvra, Root Cause Identification of Power System Faults using Waveform Analytics, 2018.

International Patent Application No. PCT/US2023/016825 International Search Report and Written Opinion, 15 pages, dated Jul. 10, 2023.

Enterprise Integration, the Solution to Your PTC False Positive Enforcement Problem, Dec. 31, 2019.

Placencia, Reviewing the Use of Proactive Data Analysis in Developing Rail Safety Culture, Dec. 31, 2016.

Brown, Text Mining the Contributors to Rail Accidents, Feb. 29, 2016.

Alawad et al., Wireless Sensor Networks: Toward Smarter Railway Stations, Jul. 17, 2018.

Zhang et al., Positive Train Control (PTC) for railway safety in the United States: Policy developments and critical issues, Dec. 31, 2018.

* cited by examiner

814 → Brake Event Search

802 → Home  
804 → Event Analysis ▼  
806 → Stats ▼  
808 → Event Reclassification  
810 → Closeout Dashboard  
812 → Event Profile

| Start Date | End Date | Subdivision | Mile Post Range | |
|---|---|---|---|---|
| 12/07/2020 | 12/07/2020 | All Subdivisions | From | To |

[SEARCH WITH FILTER] [RESET]  ☐ Analyzed Only    EXPORT SEARCH 65 records found...

| Train | Locomotive | Software | Event Date | Event Time | Subdivision | Target Type | Target Desc | Enforcement | Start MP | End MP | Status |
|---|---|---|---|---|---|---|---|---|---|---|---|
| S LBTLPC 1 03 K | BNSF 4241 | 6.3.19.3 | 12/07/2020 | 13:32:12 | MARCEL | TrackDevice | SWITCH UNKNOWN | PREDICTIVE | 300.382 | 300.382 | Completed |

Comments  
UNKNOWN]. The crew had no predictive or reactive warnings within 3 minutes of being enforced. Train stopped -3068 feet short of target. Last 5200 was sent to No speed jumps were found during analysis. Automation determined root cause to be WIU Issue. Calibrated Wheel Size: 40.31 Emergency applied: 2020/12/07  
13:32:22 No System State Log found within 2 hour window Classification    WIU Issue  
Owner    Signal  
Solution    Handled Through normal Ticketing Process [1168]  
Solution Details  
Category    Technical  
SubSystem    Hardware

VIEW ANALYSIS

| Engineer | Departure | Direction | Enforcement Speed | Target Speed | Brake Distance |
|---|---|---|---|---|---|
| | 12/03/2020 | E | 54.2 | 0 | 6552 |

Track  
MAIN 2

| | | | | | | | | |
|---|---|---|---|---|---|---|---|---|
| | | | 12/07/2020 13:25:34 | SignalBasedAuthority | SIGNAL | REACTIVE | 17.208 | 17.424 | Completed |
| | | | 12/07/2020 13:10:54 | TrackDevice | SWITCH ALIGNMENT | PREDICTIVE | 142.636 | 142.636 | Completed |
| | | | 12/07/2020 12:43:39 | Speed | EQUIPMENT RESTRICTION | REACTIVE | 43.94 | 55 | Completed |

FIG. 8

AUTOMATED POSITIVE TRAIN CONTROL EVENT DATA EXTRACTION AND ANALYSIS ENGINE AND METHOD THEREFOR

CROSS-REFERENCE TO RELATED APPLICATIONS

The present application is a Continuation of U.S. patent application Ser. No. 17/721,204, filed Mar. 14, 2022, the entirety of which is herein incorporated by reference for all purposes.

TECHNICAL FIELD

The present disclosure relates generally to management of positive train control events, and more particularly to an automated positive train control event data extraction and analysis engine and method therefor.

BACKGROUND

Managing a fleet of trains is a complex system of systems. Determining the root cause of an event that triggers a train in the fleet to come to a complete stop can be a time-consuming, laborious task. The series of components involved in this system of systems makes it virtually impossible to rely on a single source of data to identify and resolve the issue. Organizations that manage fleets of trains can quickly become overwhelmed by the number of events that occurred across the network of trains not to mention the amount of time needed to identify the root cause of the event, document the major points of the event, and notify the appropriate personnel. Manual analysis of train events can take hours to identify the root cause and days to resolve. Adding to the complexity are Positive Train Control (PTC) systems that can generate myriad braking events related to a single train's operation. For example, when a train is in danger of exceeding its lined authority or going over its promulgated speed, it initiates a PTC penalty application affecting the speed of the train—known as a PTC or brake event.

While organizational methods and personnel can be useful in identifying and managing root cause analyses about train events, the inspection process is still typically a manual endeavor. Railroad personnel are still required to inspect those fleets and make the final decision as to the cause of the train event. Such personnel can misclassify events, improperly document train system logs, and require periodic training. Most events usually require approximately one hour in manual analysis to conduct a root cause analysis, and some more than a full day. Additionally, the root cause can result from a variety of factors such as a dropped signal, an issue with the train, a hardware or software issue, or human error. If the root cause of an enforcement was due to a signal or field issue, the railroad could incur multiple enforcements at that same location as other trains attempt to pass. With such a complex system, manual inspection of a fleet of trains is insufficient.

SUMMARY

The present disclosure achieves technical advantages as a system and method for automating workflow and performing root cause analysis of Positive Train Control (PTC) enforcement events using an automated positive train control event data extraction and analysis engine. The system can enable accurate detection of an enforcement event and identify the root cause of such events. The system can provide a user with an interface to monitor the enforcement event by collecting a list of data characterizing the enforcement event, as well as analyze the data to evaluate and determine the root cause of the enforcement event. The system can also extract critical information from train system logs of the train using an extraction model to generate a window of activity providing an analysis model with a comprehensive scope to analyze the enforcement event. Additionally, the system can give the user robust and accurate information of the root cause of the enforcement event.

The present disclosure solves the technological problem of providing an automated tool for identifying train events providing the root cause of an enforcement event in less time than manual inspection given voluminous data from multiple, disparate sources by extracting relevant data from large amounts of data. An enforcement, for example, can include an event when a locomotive comes to a complete stop based on various safety policy breaches. In contrast, traditional systems simply rely on manual inspection techniques that can be inundated with errors adding to the stress of an event with a stopped train on the tracks. Given the copious amounts of log information generated each day by a railroad network of trains and events, identifying the relevant data to process is a major hurdle to overcome.

The present disclosure provides a technological solution missing from conventional systems via an extraction and analysis engine that can identify train events, retrieve train system logs, translate and transform structured and unstructured data into a predefined, standard format, perform root-cause analysis of PTC events, and notify subscribed users of the resolution. The extraction and analysis engine can implement one or more extraction models to identify the relevant data. The present disclosure provides for improved system performance through an extraction and analysis engine (and corresponding models) that can parse a plurality of PTC event-related files to retrieve only relevant details related to a particular PTC event, and implement a user-defined operational, scenario-based enforcement. Advantageously, an automated positive train control event data extraction and analysis engine and method is provided that can conduct a root cause analysis to determine the cause of PTC brake events without user interaction to alleviate the repetitive tasks involved in brake-event reporting. In another embodiment, the automated extraction model and automated analysis model can automatically (without user interaction) extract relevant log data and analyze brake event data using machine-learning algorithms. For example, the PTC event automation extraction/analysis engine can implement a natural language processing keyword detection algorithm to identify relevant information. Once the root cause is identified, the system can generate a detailed report for transmission to all event subscribers and close the event. Additionally, the system can categorize braking events for reporting purposes, escalate events for review, and provide in-depth brake event analysis. The system can also provide at least the following functionality:

Live or historical analysis;
Multiple onboard software versions that can be processed in parallel;
Solution tracking for problem resolution;
Alerting;
User subscriptions;
Wide range of classification models;
Continuous improvements;
System reporting;
High level classification; and
Data retention.

The present disclosure technologically surpasses conventional manual analysis of the train event by providing an automated data extraction and analysis engine to efficiently identify relevant data in myriad log data and process the data to determine a root cause using data analysis techniques in minutes or even seconds, thereby minimizing train downtime. Accordingly, the present disclosure discloses concepts inextricably tied to computer technology such that the present disclosure provides the technological benefit of simplifying the data extraction and data analysis process by providing only the relevant information needed to identify and analyze a particular train event. Using this analysis provides a quicker solution to manual inspection minimizing any delays in train functionality, while also optimizing train event investigation time.

When an event occurs, the system can recognize the new events and downloaded the necessary logs. Once the logs are downloaded, decompressed, and stored in a directory for the system to begin processing, the event can be stored in a queue to execute on the next instantiation to begin processing and analyzing the event. The system can implement control logic, machine learning, and/or system services to verify the event time, identify the primary CPU during enforcement, verify the event occurred, determine the appropriate system component software version, and initiate a high-level system health scan to ensure the data is reliable to perform event analysis. Once completed and the event is cleared for processing, the system can select an appropriate extraction model to attain the appropriate data points. As software versions change and adapt, the additional extraction models are developed and presented for system selection upon at least partial event analysis. When the extraction model begins, all logs can be moved into a dictionary to give each row of log data a unique identifier. The extraction model can implement either prebuilt regular expressions or data manipulation practices (such as splitting) when compiling a delimited (structured) row to gain insight and valuable intel. Logs can be processed to normalize the data according to a uniform data structure. The system further allows the extraction of data points, the calculation of variables, and the creation of event time windows for the data.

In another embodiment, as priority data points are determined in the logs, the system can generate data points surrounding how the event occurred, and when the event occurred compared to the time of enforcement. These time windows can simulate how manual analysis is performed. For example, time windows can be seconds, minutes, or hours, and both positive or negative (occurring before or after) in relation to the time of enforcement.

The data can then be transformed and processed via one or more analysis models instantiated on one or more devices. In another embodiment, analysis models can be created using a variety of data science methods including Decision Tree, Classification, and Clustering, to name a few. Once a model is developed, the system can transform the model into customized algorithms that can be implemented by control logic, servers, processors, or other suitable devices. The analysis modes can be software specific and have a hierarchy. In another embodiment, defect analysis can be completed first. If a defect is found, the analysis can be concluded as the defect is identified as the cause of the main issue—not the response to the defect. Second, the events can be processed based on models created over time regarding engineer interactions, system component responses, and situational behavior, among others. The model can then be exited and a second (or subsequent) model instantiated with the data. If the second model does not agree with the first model, the system can determine the correct model, and close the event. For each model endpoint, e.g., in both models, a unique identifier can be created. The unique identifier allows the system to track and dynamically update the model endpoint from the backend by updating the database values for a specific unique identifier. In another embodiment, if no root cause is determined, the analysis model can create a high-level classification for the event by combining the target type, target description, and the last banner shown to the engineer prior to enforcement, among other parameters and values, thereby providing a user with some level of detail regarding the event without manual investigation.

In another embodiment, with the data retrieved from the extraction and analysis models, the system can create a detailed synopsis of the events leading up to enforcement, as well as the assigned root cause. These events include: time train went active, how fast the train was going at time of enforcement, location details, warnings that may have occurred, train configuration details, PTC component information, type of enforcement, type of braking, and others. Together, these data points can provide the benefit of allowing the end user to understand what transpired and how the system made its determination.

When the root cause is identified (or a high-level classification), the system can use the parameters from AES to determine who needs to be notified of the event, as well as the severity of the notification. If an alert is assigned to the analysis model identifier, then the appropriate railroad teams can receive an e-mail notifying them of additional steps to be taken immediately to reduce the chance of repeat offenses.

It is an object of the invention to provide a system for automating workflow and performing root cause analysis for data structures. It is a further object of the invention to provide a method of automating workflow and performing root cause analysis for data structures. It is a further object of the invention to provide a computer-implemented method for automating workflow and performing root cause analysis for data structures. It is a further object of the invention to provide a method for determining the cause of a PTC brake event without user interaction. These and other objects are provided by at least the following embodiments.

In one embodiment, a system for automating workflow and performing root cause analysis for data structures, including a memory having a database with train system logs; and a networked computer processor operably coupled to the memory and capable of executing machine-readable instructions to perform program steps, the program steps including receiving a message including information about a train event; retrieving the train system logs corresponding to the message to identify at least one characteristic corresponding to the train event such as an event time, a primary central processing unit (CPU) during enforcement of the train event, an appropriate component software version, and a high-level system health scan; verifying an actual occurrence of the train event based on the at least one characteristic; identifying an extraction model to generate data such as a time window of the train event corresponding to the train system logs; transforming the data to generate extracted data; analyzing the extracted data using an analysis model to generate an analysis result; if the analysis result does not include the root cause, creating, via the analysis model, a high-level classification for the train event and assigning a unique identifier (ID) to the analysis result; if the analysis result includes the root cause, assigning, via the analysis model, an alert ID to the analysis result; and sending a synopsis corresponding to the unique ID or the alert ID to a user using an automatic email system (AES). Wherein the synopsis comprises a plurality of events such as a time that a train was active, a speed of the train during the enforcement of the train event, location details of the train, warnings to the train, configuration details of the train, positive train control (PTC) component information, a type of the enforcement, and a type of braking. Wherein the high-level classification comprises a target type, target description, and a banner. Wherein the program steps further comprise: analyzing the extracted data using a defect detection analysis model; if a defect is detected, classifying the root cause as the defect; and if the defect is not detected, analyzing the extracted data using a historical analysis model. Wherein the historical analysis model can be based on historical data such as previous engineer interactions, system component responses, and situational behavior. Wherein the train system logs comprise either structured data or unstructured data. Wherein the extraction model uses either regular expressions or data manipulation practices. Wherein the analysis model comprises a decision tree model, a classification model, or a clustering model.

In another embodiment, a method of automating workflow and performing root cause analysis for data structures, including receiving a message including information about a train event; retrieving the train system logs corresponding to the message to identify at least one characteristic corresponding to the train event, such as an event time, a primary CPU during enforcement of the train event, an appropriate component software version, and a high-level system health scan; verifying, via a processor, an occurrence of the train event based on the at least one characteristic; instantiating an extraction model, via the processor, to generate data such as a time window of the train event corresponding to the train system logs; transforming, via the processor, the data to generate extracted data; analyzing the extracted data using an analysis model to generate an analysis result; if the analysis result does not include the root cause, generating, via the analysis model, a high-level classification for the train event and assigning a unique ID to the analysis result; if the analysis result includes the root cause, assigning, via the analysis model, an alert ID to the analysis result; and generating and transmitting a synopsis (e.g., corresponding to the unique ID or the alert ID) to a user, using for example an AES. Wherein the detailed synopsis comprises a plurality of events such as a time that a train was active, a speed of the train during the enforcement of the train event, location details of the train, warnings to the train, configuration details of the train, PTC component information, a type of the enforcement, and a type of braking. Wherein the high-level classification comprises a target type, target description, and a banner. Wherein the program steps further comprise: analyzing the extracted data using a defect detection analysis model; if a defect is detected, classifying the root cause as the defect; and if the defect is not detected, analyzing the extracted data using a historical analysis model. Wherein the historical analysis model can be based on historical data such as previous engineer interactions, system component responses, and situational behavior. Wherein the train system logs comprise either structured data or unstructured data. Wherein the extraction model uses either regular expressions or data manipulation practices. Wherein the analysis model comprises a decision tree model, a classification model, or a clustering model.

In another embodiment, a computer-implemented method for automating workflow and performing root cause analysis for data structures, including receiving a message including information about a train event; retrieving train system logs corresponding to the message to identify at least one characteristic corresponding to the train event such as an event time, a primary CPU during enforcement of the train event, an appropriate component software version, and a high-level system health scan; verifying an actual occurrence of the train event based on the at least one characteristic; identifying an extraction model to generate data such as a time window of the train event corresponding to the train system logs; transforming the data to generate extracted data; analyzing the extracted data using an analysis model to generate an analysis result; if the analysis result does not include the root cause, creating, via the analysis model, a high-level classification for the train event and assigning a unique ID to the analysis result; if the analysis result includes the root cause, assigning, via the analysis model, an alert ID to the analysis result; and sending a detailed synopsis corresponding to the unique ID or the alert ID to a user using an AES. Wherein the detailed synopsis comprises a plurality of events such as a time that a train was active, a speed of the train during the enforcement of the train event, location details of the train, warnings to the train, configuration details of the train, PTC component information, a type of the enforcement, and a type of braking. Wherein the high-level classification comprises a target type, target description, and a banner. Wherein the program steps further comprise: analyzing the extracted data using a defect detection analysis model; if a defect is detected, classifying the root cause as the defect; and if the defect is not detected, analyzing the extracted data using a historical analysis model. Wherein the historical analysis model can be based on historical data such as previous engineer interactions, system component responses, and situational behavior. Wherein the train system logs comprise either structured data or unstructured data. Wherein the extraction model uses either regular expressions or data manipulation practices. Wherein the analysis model comprises a decision tree model, a classification model, or a clustering model.

In another embodiment, a method for determining the cause of a PTC brake event without user interaction, including: receiving a brake event from a PTC system; extracting data from the brake event; transforming the extracted data into one or more dictionaries; analyzing the dictionaries, via a machine-learning module, to identify the cause of the event using training data models; and assigning a unique analysis code to each dictionary to control the model output. Wherein the dictionaries transform the data into a predetermined format. Wherein the training data parameters include live or historical data. Wherein the training data models include user-based parameters. Wherein the method further comprises transmitting a notification to all event subscribers. Wherein the method further comprises categorizing the brake event into one or more predetermined categories.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

FIG. 8 illustrates an embodiment of an automated workflow system interface, in accordance with one or more embodiments of the present disclosure;

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. Pursuant to MPEP § 904, the Examiner, after having obtained a thorough understanding of the invention disclosed and claimed in the nonprovisional application has searched the prior art as disclosed in patents and other published documents, i.e., nonpatent literature. Therefore, as evidenced by the issuance of this patent, the prior art fails to disclose or teach the elements and limitations presented in the claims as enabled by the specification and drawings, such that the presented claims are patentable under 35 U.S.C. §§ 101, 102, 103, and 112.

Figure 1:
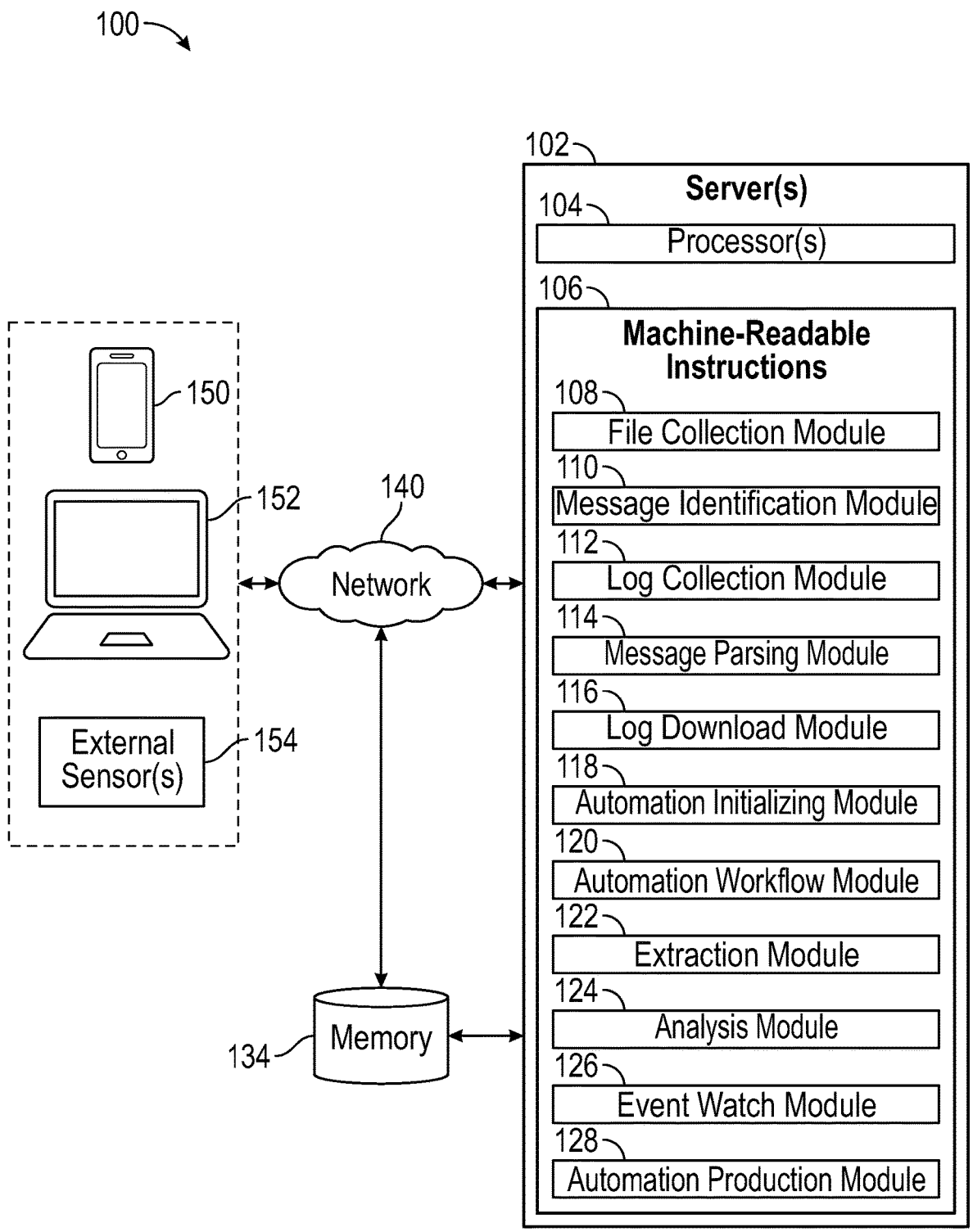
FIG. 1 illustrates an automated workflow system, in accordance with one or more embodiments of the present disclosure.

FIG. 1 illustrates a schematic view of an automated workflow system 100, in accordance with one or more embodiments of the present disclosure. The system 100 can include one or more servers 102 having one or more processors 104, a memory 134, machine readable instructions 106, including a file collection module 108, message identification module 110, log collection module 112, information parsing module 114, log download module 116, automation initializing module 118, automation workflow module 120, extraction module 122, analysis module 124, event watch module 126, and automation production module 128, among other relevant modules. The server 102 can be operably coupled to one or more clients via a network 140. The clients can be a physical device (e.g., mobile phone 150, laptop 152, external sensors 154, desktop computer, wearable device, or other suitable device), program, or application. In another embodiment, a client can include a mobile phone 150 having a mobile application configured to communicate with the server 102 over the network 140.

The aforementioned system components (e.g., server(s) 102 and client(s) 150, 152, 154, 156, etc.) can be communicably coupled to each other via the network 140, such that data can be transmitted. The network 140 can be the Internet, intranet, or other suitable network. The data transmission can be encrypted, unencrypted, over a virtual private network (VPN) tunnel, or other suitable communication means. The network 140 can be a wide area network (WAN), local area network (LAN), personal area network (PAN), or other suitable network type. The network communication between the clients, server 102, or any other system component can be encrypted using pretty good privacy (PGP), Blowfish, Twofish, triple data encryption standard (3DES), hypertext transfer protocol secure (HTTPS), or other suitable encryption. The system 100 can be configured to provide communication via the various systems, components, and modules disclosed herein via an application programming interface (API), peripheral component interface (PCI), PCI-Express, American National Standards Institute (ANSI)-X12, Ethernet, Wi-Fi, Bluetooth, or other suitable communication protocol or medium. Additionally, third party systems and databases can be operably coupled to the system components via the network 140.

The data transmitted to and from the components of system 100 (e.g., the server 102 and clients), can include any format, including JavaScript Object Notation (JSON), transfer control protocol (TCP)/internet protocol (IP), extensible markup language (XML), hypertext markup language (HTML), American Standard Code for Information Interchange (ASCII), short message service (SMS), comma-separated value (CSV), representational state transfer (REST), or other suitable format. The data transmission can include a message, flag, header, header properties, metadata, and/or a body, or be encapsulated and packetized by any suitable format having same.

The server(s) 102 can be implemented in hardware, software, or a suitable combination of hardware and software therefor, and may comprise one or more software systems operating on one or more servers, having one or more processors 104, with access to memory 134. Server(s) 102 can include electronic storage, one or more processors, and/or other components. Server(s) 102 can include communication lines, connections, and/or ports to enable the exchange of information via a network 140 and/or other computing platforms. Server(s) 102 can also include a plurality of hardware, software, and/or firmware components operating together to provide the functionality attributed herein to server(s) 102. For example, server(s) 102 can be implemented by a cloud of computing platforms operating together as server(s) 102, including Software-as-a-Service (SaaS) and Platform-as-a-Service (PaaS) functionality. Additionally, the server(s) 102 can include memory 134.

Memory 134 can comprise electronic storage that can include non-transitory storage media that electronically stores information. The electronic storage media of electronic storage can include one or both of system storage that can be provided integrally (e.g., substantially non-removable) with server(s) 102 and/or removable storage that can be removably connectable to server(s) 102 via, for example, a port (e.g., a Universal Serial Bus (USB) port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., erasable electronic programmable read only memory (EEPROM), random access memory (RAM), etc.), solid-state storage media (e.g., flash drive, etc.), and/or other electronically readable storage media. Electronic storage may include one or more virtual storage resources (e.g., cloud storage, a virtual private network, and/or other virtual storage resources). The electronic storage can include a database, or public or private distributed ledger (e.g., blockchain). Electronic storage can store machine-readable instructions 106, software algorithms, control logic, data generated by processor(s), data received from server(s), data received from computing platform(s), and/or other data that can enable server(s) to function as described herein. The electronic storage can also include third-party databases accessible via the network 140.

Processor(s) 104 can be configured to provide data processing capabilities in server(s) 102. As such, processor(s) 104 can include one or more of a digital processor, an analog processor, a digital circuit designed to process information, an analog circuit designed to process information, a state machine, and/or other mechanisms for electronically processing information, such as field programmable gate arrays (FPGAs) or application specific integrated circuits (ASICs). The processor(s) 104 can be a single entity or include a plurality of processing units. These processing units can be physically located within the same device, or processor(s) 104 can represent processing functionality of a plurality of devices or software functionality operating alone, or in concert. A networked computer processor can be a processor 104 operably coupled to the network 140. The networked computer processor can be operably coupled to other processors, databases, or components.

The processor(s) 104 can be configured to execute machine-readable instructions 106 or machine learning modules via software, hardware, firmware, some combination of software, hardware, and/or firmware, and/or other mechanisms for configuring processing capabilities on processor(s) 104. As used herein, the term "machine-readable instructions" can refer to any component or set of components that perform the functionality attributed to the machine-readable instructions component 106. This can include one or more physical processors 104 during execution of processor-readable instructions, the processor-readable instructions, circuitry, hardware, storage media, or any other components.

The server(s) 102 can be configured with machine-readable instructions having one or more functional modules. The machine-readable instructions 106 can be implemented on one or more servers 102, having one or more processors 104, with access to memory 130. The machine-readable instructions 106 can be a single networked node, or a machine cluster, which can include a distributed architecture of a plurality of networked nodes. The machine-readable instructions 106 can include control logic for implementing various functionality, as described in more detail below. The machine-readable instructions 106 can include certain functionality associated with the system 100. Additionally, the machine-readable instructions 106 can include a smart contract or multi-signature contract that can process, read, and write data to the database, distributed ledger, or blockchain.

Figure 2:
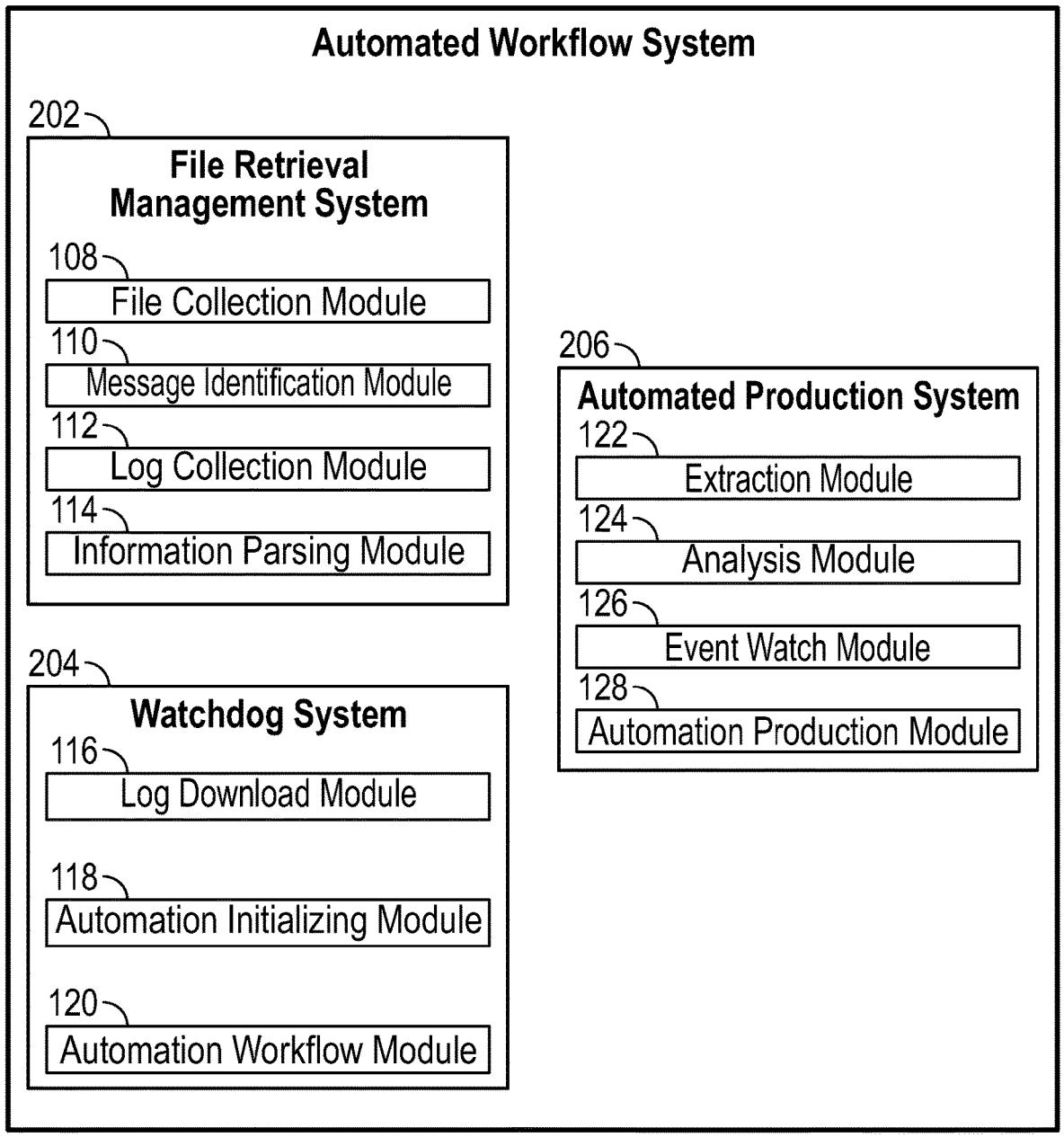
FIG. 2 illustrates a block diagram of an automated workflow system, in accordance with one or more embodiments of the present disclosure.

FIG. 2 illustrates a schematic view of an automated workflow system 200, in accordance with one or more embodiments of the present disclosure. The automated workflow system 200 can include a file retrieval management system 202, a watchdog system 204, and an automated production system 206. Although certain embodiments may be directed to identifying root causes of PTC brake events, the automated workflow system 200 can be used to automate workflow for identifying root causes for various types of events and systems such as policy enforcement events, repeat offender notifications, and authority notifications systems.

In one embodiment, the file retrieval management system 202 can include the file collection module 108, the message identification module 110, the log collection module 112, and the information parsing module 114. The file collection module 108, the file parsing module 110, the log collection module 112, and the information parsing module 114 can implement one or more algorithms to facilitate retrieval of files and logs of railroad events for various systems, including status, selection, and authentication algorithms. The algorithms and their associated thresholds and/or signatures can be programmable to suit a particular railroad events, application, function, facility, or other requirement. The file retrieval management system 202 can be configured to retrieve and modify files and logs related to one or more enforcement events or other suitable activity, to and from the client or server. In another embodiment, the file retrieval management system 202 can generate one or more elements for display on the user device. The elements can provide additional information related to the status of railroad event management. For example, notifications can be generated by the file retrieval management system 202 and displayed on the client to indicate file collections, log parsing, automated workflow initialization, railroad event handling, errors, or other suitable information. Additionally, system symbols can be displayed on the client to indicate task, inspection, or analysis status.

The file collection module 108 can receive incoming messages regarding railroad event notifications. For example, the railroad event notification can include enforcement events, such as a PTC brake event. In one embodiment, the file collection module 108 can receive the incoming messages from a file retrieval manager (FRM). For example, the incoming messages can correspond to one or more of the enforcement events. In another embodiment, the file collection module 108 can transmit outgoing messages to the FRM. For example, the outgoing messages can request train system logs corresponding to one or more of the enforcement events. In another embodiment, the file collection module 108 can receive a notification indicating the train system logs are available.

In another embodiment, the file collection module 108 can generate an authentication token for a particular user, session, or request. In another embodiment, the file collection module 108 can access the network 140 without user credentials. In another embodiment, the file collection module 108 can generate an authentication token using user data stored in the client. For example, a user can access a client and/or the automated workflow system 200 by providing valid credentials via a login page or screen, including a username and password, biometrics, multi-factor authentication, or other suitable credential, such credentials, along with a user's information such as name, username, employee number, etc., can be stored in the client or server. In another embodiment, the file collection module 108 can process at least a portion of the credentials and/or user information to generate an authentication token. For example, the authentication token can be generated as a JSON Web Token (JWT), via dongles or key fobs that can periodically generate a new authentication token in accordance with a known algorithm, using an authenticator app on the client or sent on demand via SMS, by hashing at least a portion of the login credentials, or other suitable methodology.

In another embodiment, the authentication token can allow for single sign-on authentication to the server and/or memory from the client. In another embodiment, the file collection module 108 can operate without a user interface. In another example, the file collection module 108 can provide a user interface for a user to access the file collection module 108. The automated workflow system 200 can utilize the file collection module 108 to provide a user interface for receiving relevant data.

The message identification module 110 can classify the incoming messages and the notification. In one embodiment, the message identification module 110 can receive information about an enforcement event from the incoming messages and the notification. For example, the message identification module 110 can classify the incoming messages as an enforcement message or a status request and classify the notification as a log status. In another embodiment, the message identification module 110 can identify the train system logs of an enforcement event. For example, the message identification module 110 can identify the characteristics of the enforcement event. In another example, the characteristics can include an event time, a primary CPU monitoring the train during the enforcement, an appropriate component software version, a high-level system health scan, among other relevant characteristics. In another example, the message identification module 110 can verify the incoming message to identify whether the enforcement event actually occurred based on at least one of the characteristics.

The log collection module 112 can receive the train system logs. In one embodiment, the train system logs are sent from the FRM. In another embodiment, the log collection module 112 can download the train system logs from an external memory. The train system logs can correspond to default set of onboard logs from at least one CPU on board the train. The train system logs can indicate characteristics of the enforcement of the brake event. In another embodiment, the log collection module 112 can store the train system logs for future access.

The information parsing module 114 can parse the incoming messages and the notification for relevant information. For example, the relevant information can include information about the enforcement event. In another example, the incoming messages can include information such as a user ID, the employee information on the train, the employee requesting the information, a location of the train, among other relevant information. In one embodiment, the information parsing module 114 can establish a connection to a database. For example, the information parsing module 114 can receive the incoming message from the database and transmit the relevant information to the database.

In one embodiment, the watchdog system 204 can include log download module 116, automation initializing module 118, automation workflow module 120. The log download module 116, automation initializing module 118, automation workflow module 120 can implement one or more algorithms to facilitate status monitoring of the train system logs, including a file fetching, event monitor, and service enable algorithm. The algorithms and their associated thresholds and/or signatures can be programmable to suit a particular railroad event monitoring system, application, function, facility, or other requirement. The watchdog system 204 can be configured to transmit and receive messages related to status monitoring or other suitable activity, to and from the client or server. In another embodiment, the watchdog system 204 can generate one or more elements for display on the client. The elements can provide additional information related to workflow automation. For example, a notification can be generated by the watchdog system 204 and displayed on the client to indicate a status update, system component log status, start of an automation service, or other suitable information. Additionally, system symbols can be displayed on the client to indicate management status.

In one embodiment, the log download module 116 can query an internal service queue. For example, the internal service queue can be located at an IP address. In another example, the log download module 116 can query the internal service queue at a specified frequency. In another example, the specified frequency can include a user-set value, or a scheduled frequency. In another example, the scheduled frequency can include an execution every six minutes. In another embodiment, the log download module 116 can determine whether the internal service queue includes a new enforcement message. For example, the control logic 500 can prompt the internal service queue to notify the log download module 116 of any updated enforcement messages. If the internal service queue lacks a new enforcement message, the control logic 500 proceeds to do nothing. If the internal service queue includes a new enforcement message, the log download module 116 proceeds to generate a record. For example, the record can include a collection of enforcement events based on enforcement messages from the internal service queue. In another example, the log download module 116 can store the record to a database. In another embodiment, the log download module 116 can parse a file retrieval system for train system logs corresponding to the new enforcement event. For example, the file retrieval system can include the FRM. In another example, the train system logs can include downloadable files.

In another embodiment, the log download module 116 can determine whether the train system logs are available. For example, the log download module 116 can determine whether the train system logs are available in the file retrieval system. In another example, the train system logs might not be generated at a time the log download module 116 checks, as the train system logs can lag. If the train system logs are unavailable, then the log download module 116 repeats the checking process after a period of time. For example, the period of time can be 49 hours. If the train system logs are available, then the log download module 116 proceeds to receive the train system logs. For example, the log download module 116 can receive the train system logs from the file retrieval system. In another example, the log download module 116 can receive the train system logs in a downloadable manner. In another example, the log download module 116 can receive the train system logs in a virtual manner, such as a cloud environment.

In another embodiment, the log download module 116 can update a status of the train system logs in the record. For example, the log download module 116 can update the record to indicate whether the train system logs were available or not. In an example, the log download module 116 can determine whether the train system logs include information for a plurality of CPUs on the train.

In one embodiment, the automation initializing module 118 can identify whether an automation service is executing. For example, the automation initializing module 118 can determine whether the automation service is executing on a designated server. In another example, the designated server can include a designated IP address. In another example, the automation initializing module 118 can determine whether the automation service is executing based on network traffic on the designated IP address, network traffic on the designated server, or another method. If the automation service is not currently executing, the automation initializing module 118 can proceed to execute the automation service. For example, the automation initializing module 118 can execute the automation service by executing initialization instructions for the automation service. If the automation service is currently executing, the automation initializing module 118 can proceed to execute an automation process. For example, the automation process can include algorithms, applications, and functions from the automated production system 206. In another example, the algorithms, applications, and functions can include one or more of the extraction modules 122, the analysis module 124, the event watch module 126, and the automation production module 128. In another example, the automation initializing module 118 can execute the automation process by executing initialization instructions for the automation process.

The automation workflow module 120 can receive processed events. For example, the processed events can include results from the automated process. In another example, the processed events can include a root cause of the enforcement event. In another example, the automation workflow module 120 can receive the processed events from the designated server. In another example, the automation workflow module 120 can store the processed events to an automation production server. In one embodiment, the automation workflow module 120 can generate a notification when the automation process is complete. For example, the notification can correspond to a result of the processed events. In another example, the automation workflow module 120 generates the notification for a group of stakeholders of the processed events. In another example, the automation workflow module 120 transmits the notification to the stakeholders via email. In one embodiment, the automation workflow module 120 can transmit event files to a completed directory. For example, the event files can include information regarding the processed events. In another example, the completed directory can include a file server specific to the processed events.

In one embodiment, the automated production system 206 can include the extraction module 122, the analysis module 124, the event watch module 126, and the automation production module 128. The extraction module 122, analysis module 124, event watch module 126, and automation production module 128 can implement one or more algorithms to facilitate automated workflow and identify a root cause of a train event, including an extraction, analysis monitor, and event watch algorithm. The algorithms and their associated thresholds and/or signatures can be programmable to suit a particular railroad event monitoring system, application, function, facility, or other requirement. The automated production system 206 can be configured to transmit and receive messages related to workflow automation or other suitable activity, to and from the client or server. In another embodiment, the automated production system 206 can generate one or more elements for display on the user device. The elements can provide additional information related to root cause analysis. For example, a notification can be generated by the automated production system 206 and displayed on the client to indicate a root cause is identified, train system logs extracted, event monitoring, or other suitable information. Additionally, system symbols can be displayed on the client to indicate an event status, analysis completion, or root cause identified.

In one embodiment, the extraction module 122 can receive data from a file server. For example, the data can correspond to train system logs including characteristics of an enforcement event. In another example, the file server can include train system logs from a plurality of enforcement events. In another embodiment, the extraction module 122 can collect data surrounding a time of the enforcement event to generate a time window. For example, the data can correspond with the train system logs. In another example, the time window can include time measurements before the enforcement event, after the enforcement event, or both before and after the enforcement event. In another example, the time window can include seconds, minutes, or hours relating to the enforcement event. In another example, the extraction module 122 can compare the time of the enforcement with the data to verify the enforcement event actually occurred.

In another embodiment, the extraction module 122 can label the data with unique identifiers. For example, the extraction module 122 can label the train system logs based on the characteristics. In another embodiment, the extraction module 122 can determine whether the data is structured. For example, the data can be structured when information in the data is classified according to a predetermined manner. In another example, the data can be unstructured when the information in the data can be classified differently than the predetermined manner or unclassified entirely. In another embodiment, when the data is unstructured, the extraction module 122 can identify a pattern in the unstructured data to transform the data into structured data and extract the data. In another embodiment, the extraction module 122 can transform the unstructured data into structured data by organizing the unstructured according to a predetermined data structure. The extraction module 122 can transform the unstructured data by assigning elements of the unstructured data to one or more categories, fields, or metadata. In another embodiment, when the data is structured, the extraction module 122 can extract the data. In another example, the extraction module 122 can extract data using regular expression. In another example, the regular expressions can include a sequence of characters that define a search pattern. In another example, the extraction module 122 can extract data using data manipulation techniques. In another example, the data manipulation techniques can include using commercial software tools such as HADOOP® or custom data tools. In another embodiment, the extraction module 122 transmits the extracted data to the analysis module 124.

In one embodiment, the analysis module 124 can analyze the extracted data to generate an analysis result. For example, the analysis result can include whether the analysis module 124 determined a root cause. In another example, the analysis module 124 can include a plurality of decision steps to determine whether the root cause is established. In another embodiment, the analysis module 124 can analyze the extracted data using a defect detection analysis model. For example, the defect detection analysis model identifies when a defect during the analysis occurs. In another example, when the defect occurs, the analysis module 124 classifies the defect as the root cause. In another example, when the defect does not occur, the analysis module 124 can analyze the extracted data using a historical analysis model. In another example, the historical analysis model can be based on historical data such as previous engineer interactions, system component responses, and situational behavior. In another example, the analysis module 124 can analyze the extracted data using a decision tree model, a classification model, or a clustering model. In one embodiment, the analysis module 124, the event watch module 126, and the automation production module 128 can form an analysis model.

In one embodiment, one or more analysis thresholds can determine whether the automated workflow system 206 performs a single analysis model or multiple analysis models. This adaptive analysis thresholding can alter one or more characteristics of the database. Additionally, the analysis thresholds are adaptive as the thresholding can change based upon the historical data, data type, timestamp, or other relevant data. For example, the system can compare a first accuracy of an output from a first analysis model to a preset analysis threshold. The preset analysis threshold can include a user-defined accuracy value. So, as the first analysis model outputs a first root cause of a penalty event, the system can verify whether the first root cause is a cause of the penalty event. In an example, when the first accuracy of the first root cause is below the preset analysis threshold, the system can continue with a second analysis model.

By way of further example, when the second analysis model executes, the second analysis model compares historical data with the penalty event. The historical data can include data about a particular locomotive, a fleet of locomotives, user-defined inputs, or some other data associated to penalty events. If the system identifies a match between the historical data and the penalty event, the system outputs a second root cause of the penalty event based on the historical data. The second root cause corresponds with a second accuracy. The system can compare the first accuracy of the first root cause with the second root cause to determine whether the two root causes are the same or different.

In another exemplary embodiment, the system can provide thresholding when comparing the first accuracy and the second accuracy. For example, the system can compare the two accuracies based on subsequent measures of accuracy. The system can initially compare the two root causes for similarities, and when the two root causes are the same, the system can conclude the similar root cause is a cause of the penalty event. Upon initial measurement, when one of the accuracies is above an analysis threshold, the accuracy above the analysis threshold can correspond with a root cause of the penalty event. In an event when both accuracies are above the analysis threshold, the system can compare the two root causes for similarities. If the two root causes are the same, then the system determines the similar root cause is the cause of the penalty event. If the two root causes are different, then the system can execute another round of comparison. The second round of comparison can include various forms of tie breaking such as higher accuracy measurement, user-intervention, rerunning the analysis, or some other form of determining the root cause.

In one embodiment, the event watch module 126 can receive the analysis result from the analysis module 124. In one embodiment, when the analysis result does not include the root cause, the event watch module 126 can generate a high-level classification for the enforcement event and assign a unique ID to the analysis result. For example, the high-level classification can include a message type, a message description, and a banner. In another example, the message type can be a warning to the train prior to an enforcement event. In another example, the message description can include a description of the warning including information such as the enforcement event. In another example, the banner can be the last banner shown to the engineer prior to the enforcement event. In another embodiment, when the analysis result includes the root cause, the event watch module 126 can assign an alert ID to the analysis result.

In one embodiment, the automation production module 128 can transmit a detailed synopsis to a user. For example, the detailed synopsis can include a plurality of events such as a time that a train was active, a speed of the train during the enforcement of the train event, location details of the train, warnings to the train, configuration details of the train, PTC component information, a type of the enforcement, and a type of braking event. In another example, the detailed synopsis can correspond to the unique ID or the alert ID. In another example, the automation production module 128 can transmit the detailed synopsis through an AES. In another example, the AES can include a listsery of applicable users to be notified. In another embodiment, the automation production module 128 can generate an output and distribute a notification to users based on a user list.

Figure 3:
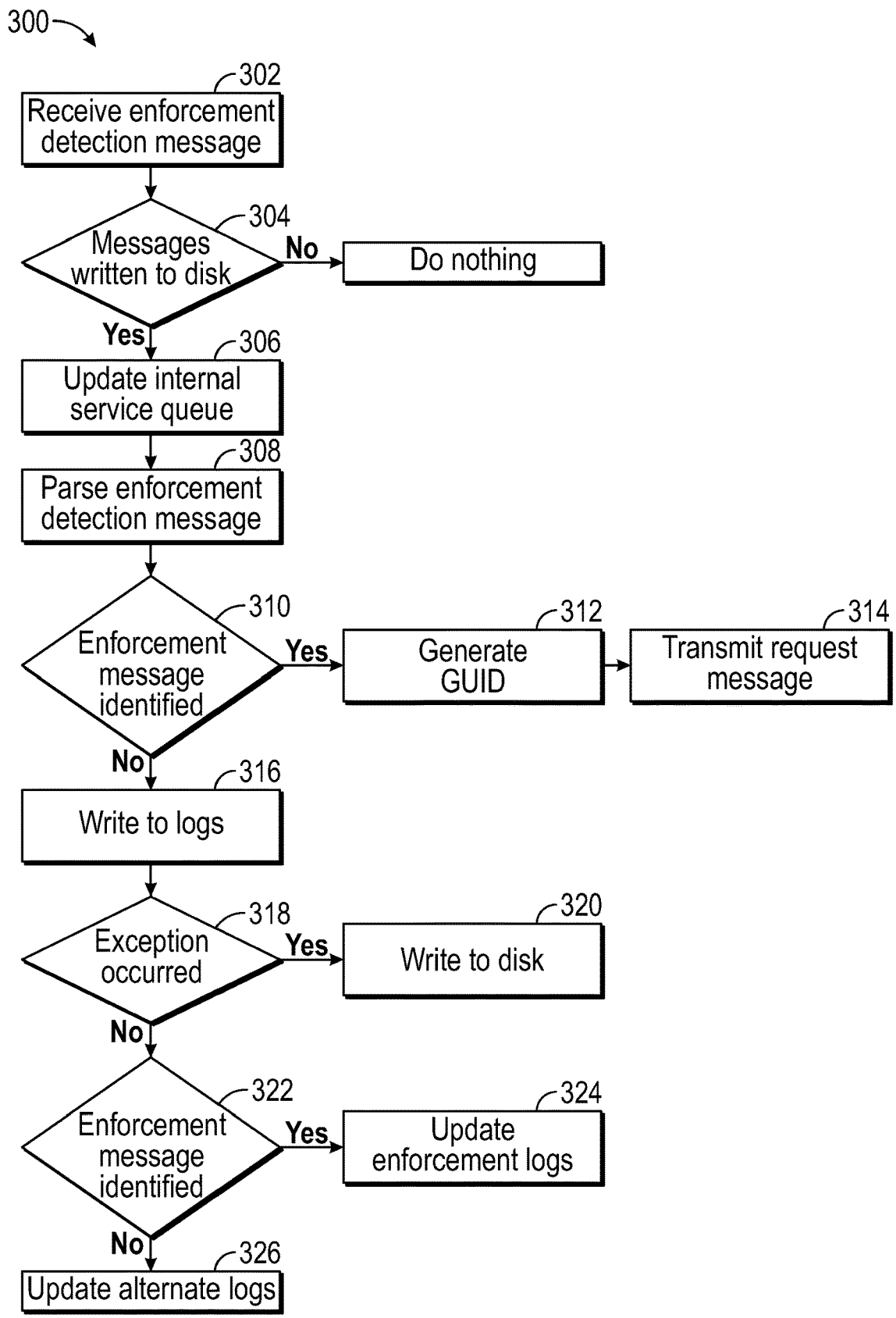
FIG. 3 illustrates a flowchart exemplifying message handling control logic, in accordance with one or more embodiments of the present disclosure.

FIG. 3 illustrates a flowchart exemplifying message handling control logic 300, in accordance with one or more embodiments of the present disclosure. The message handling control logic 300 can be implemented as an algorithm on a server 102, a machine learning module, a client, a database, or other suitable system. Additionally, the message handling control logic 300 can implement or incorporate one or more features of the file retrieval system 202, including file collection module 108, message identification module 110, log collection module 112, and information parsing module 114. The data lifecycle management control logic 300 can be achieved with software, hardware, an application programming interface (API), a network connection, a network transfer protocol, HTML, DHTML, JavaScript, Dojo, Ruby, Rails, other suitable applications, or a suitable combination thereof.

The message handling control logic 300 can leverage the ability of a computer platform to spawn multiple processes and threads by processing data simultaneously. The speed and efficiency of the message handling control logic 300 can be greatly improved by instantiating more than one process to implement data lifecycle management. However, one skilled in the art of programming will appreciate that use of a single processing thread may also be utilized and is within the scope of the present disclosure.

At step 302, in one embodiment, the control logic 300 can receive an enforcement detection message. For example, the control logic 300 can receive the enforcement detection message from the FRM. In another example, the enforcement detection message can correspond to an enforcement of a brake event applied to a train. In another example, the enforcement detection message can include information such as message length, message payload, an employee name, an employee ID, an employee role on the train, the enforcement type, a location of the train, among other relevant information. The control logic 300 proceeds to step 304.

At step 304, in one embodiment, the control logic 300 can identify whether the enforcement detection message is written to a disk. For example, the disk can be local to the system executing the control logic 300. If the enforcement detection message is not written to the disk, the control logic 300 proceeds to do nothing. If the enforcement detection message is written to the disk, the control logic 300 proceeds to step 306.

At step 306, in one embodiment, the control logic 300 can update an internal service queue. For example, the control logic 300 can generate the internal service queue to prioritize services to execute. In another example, the control logic 300 can execute services based on an order of the queue, such as a first in-first out manner. The control logic 300 proceeds to step 308.

At step 308, in one embodiment, the control logic 300 can parse the enforcement detection message. For example, the control logic 300 can classify the enforcement detection message. In another example, the control logic 300 can classify the enforcement detection message based on a railroad enforcement policy. In another example, the control logic 300 can classify the enforcement detection message as an enforcement event. In one embodiment, the control logic 300 can identify the train system logs of the enforcement detection message. For example, the message control logic 300 can identify characteristics of the enforcement event corresponding to the enforcement detection message. The control logic 300 proceeds to step 310.

At step 310, in one embodiment, the control logic 300 can identify whether the enforcement event of the enforcement detection message is a first type. For example, the control logic 300 can classify the enforcement event based on at least one of the characteristics. In another example, the first type can be a PTC brake event. If the enforcement message is the first type, the control logic 300 proceeds to step 312. If the enforcement detection message is not the first type, the control logic 300 proceeds to step 316.

At step 312, in one embodiment, the control logic 300 can generate a globally unique identifier (GUID). For example, the control logic 300 can generate a GUID for the enforcement event. The control logic 300 proceeds to step 314.

At step 314, in one embodiment, the control logic 300 can transmit a request message. For example, the control logic 300 can transmit the request message to the FRM. In another example, the request message can include the GUID of the enforcement event. The control logic 300 proceeds to step 316.

At step 316, in one embodiment, the control logic 300 can write to an automation service address. For example, the automation service address can include an IP address to receive a plurality of automation logs. In another example, the automation logs can include the GUID of the enforcement event and the enforcement event. The control logic 300 proceeds to step 318.

At step 318, in one embodiment, the control logic 300 can determine whether an exception occurred while writing to the automation service address. For example, the exception can be a network connection error, lack of storage, incorrect IP address, among other relevant exceptions. If the exception occurred, the control logic 300 proceeds to step 320. If the exception did not occur, the control logic 300 proceeds to step 322.

At step 320, in one embodiment, the control logic 300 can write to the disk. For example, the control logic 300 can write the enforcement message to the disk. In another example, the control logic 300 can write the exception to the disk. In another example, the control logic 300 can write the GUID of the enforcement event to the disk. In another example, the control logic 300 can write all of the foregoing items to the disk.

At step 322, in one embodiment, the control logic 300 can identify whether the enforcement event of the enforcement detection message is the first type. For example, the control logic 300 can classify the enforcement event based on at least one of the characteristics. In another example, the first type can be a PTC brake event. If the enforcement message is the first type, the control logic proceeds to step 324. If the enforcement message is not the first type, the control logic 300 proceeds to step 326.

At step 324, in one embodiment, the control logic 300 can update enforcement logs. For example, the enforcement logs can include first type message log, first type information log, asset status log, and crew information log.

At step 326, in one embodiment, the control logic 300 can update alternate logs. For example, the alternate logs can include second type message log and second type information log. In another example, the second type can include an alternate enforcement message.

Figure 4:
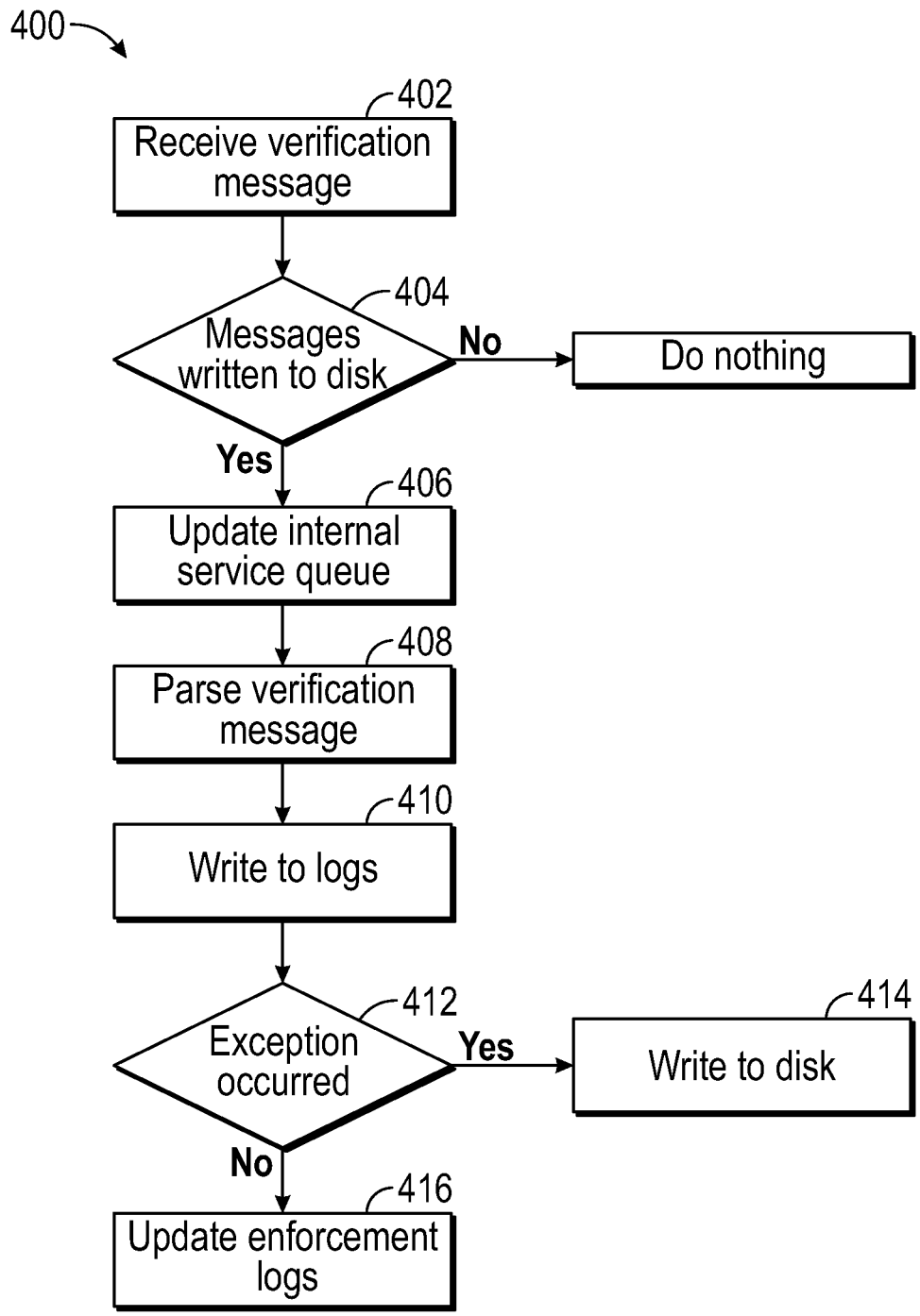
FIG. 4 illustrates a flowchart exemplifying message handling control logic, in accordance with one or more embodiments of the present disclosure.

FIG. 4 illustrates a flowchart exemplifying message handling control logic 400, in accordance with one or more embodiments of the present disclosure. The message handling control logic 400 can be implemented as an algorithm on a server 102, a machine learning module, a client, a database, or other suitable system. Additionally, the message handling control logic 400 can implement or incorporate one or more features of the file retrieval management system 202, including file collection module 108, message identification module 110, log collection module 112, and information parsing module 114. The message handling control logic 400 can be achieved with software, hardware, an API, a network connection, a network transfer protocol, HTML, DHTML, JavaScript, Dojo, Ruby, Rails, other suitable applications, or a suitable combination thereof.

The message handling control logic 400 can leverage the ability of a computer platform to spawn multiple processes and threads by processing data simultaneously. The speed and efficiency of the message handling control logic 400 can be greatly improved by instantiating more than one process to implement attaching partitioned data to a table in a database. However, one skilled in the art of programming will appreciate that use of a single processing thread may also be utilized and is within the scope of the present disclosure.

In one embodiment, commands or data can be received via user input generated on a client or server, such as a screen tap, swipe, mouse click, key press, voice command, or other suitable mechanism. In another embodiment, the inspection commands or data can include inspection data having one or more fields, parameters, characteristics, or metadata, related to an inspection. The message handling control logic 400 then proceeds to step 402.

At step 402, in one embodiment, the control logic 400 can receive a verification message. For example, the control logic 400 can receive the verification message from the FRM. In another example, the verification message can notify the control logic 400 of available train system logs. In another example, the verification message can include information such as a GUID for an enforcement event, asset type, a status, number of files available, file path length to the train system logs, among other relevant information. The control logic 400 proceeds to step 404.

At step 404, in one embodiment, the control logic 400 can identify whether the verification message is written to a disk. For example, the disk can be local to the system executing the control logic 400. If the verification message is not written to the disk, the control logic 400 proceeds to do nothing. If the verification message is written to the disk, the control logic 400 proceeds to step 406.

At step 406, in one embodiment, the control logic 400 can update an internal service queue. For example, the control logic 400 can generate the internal service queue to prioritize services to execute. In another example, the control logic 400 can execute services based on an order of the queue, such as a first in-first out manner. The control logic 400 proceeds to step 408.

At step 408, in one embodiment, the control logic 400 can parse the verification message. For example, the control logic 400 can receive the information from the verification message. In another example, the control logic 400 can classify the verification message based on a railroad enforcement policy. In another example, the control logic 400 can classify the verification message as a status notification of an availability of train system logs. In one embodiment, the control logic 400 can identify a location of the train system logs from the verification message. For example, the message control logic 400 can identify characteristics of the enforcement event corresponding to the verification message. The control logic 400 proceeds to step 410.

At step 410, in one embodiment, the control logic 400 can write to an automation service address. For example, the automation service address can include an IP address to receive a plurality of automation logs. In another example, the automation logs can include the GUID of the enforcement event and the enforcement event. The control logic 400 proceeds to step 412.

At step 412, in one embodiment, the control logic 400 can determine whether an exception occurred while writing to the automation service address. For example, the exception can be a network connection error, lack of storage, incorrect IP address, among other relevant exceptions. If the exception occurred, the control logic 400 proceeds to step 414. If the exception did not occur, the control logic 400 proceeds to step 416.

At step 414, in one embodiment, the control logic 400 can write to the disk. For example, the control logic 400 can write the exception to the disk. In another example, the control logic 400 can write the GUID of the enforcement event to the disk. In another example, the control logic 400 can write any, all, or none of the foregoing items to the disk.

At step 416, in one embodiment, the control logic 400 can update enforcement logs. For example, the enforcement logs can include request message log, request information log, asset response log, asset request detail, and an asset file, among other relevant logs.

Figure 5:
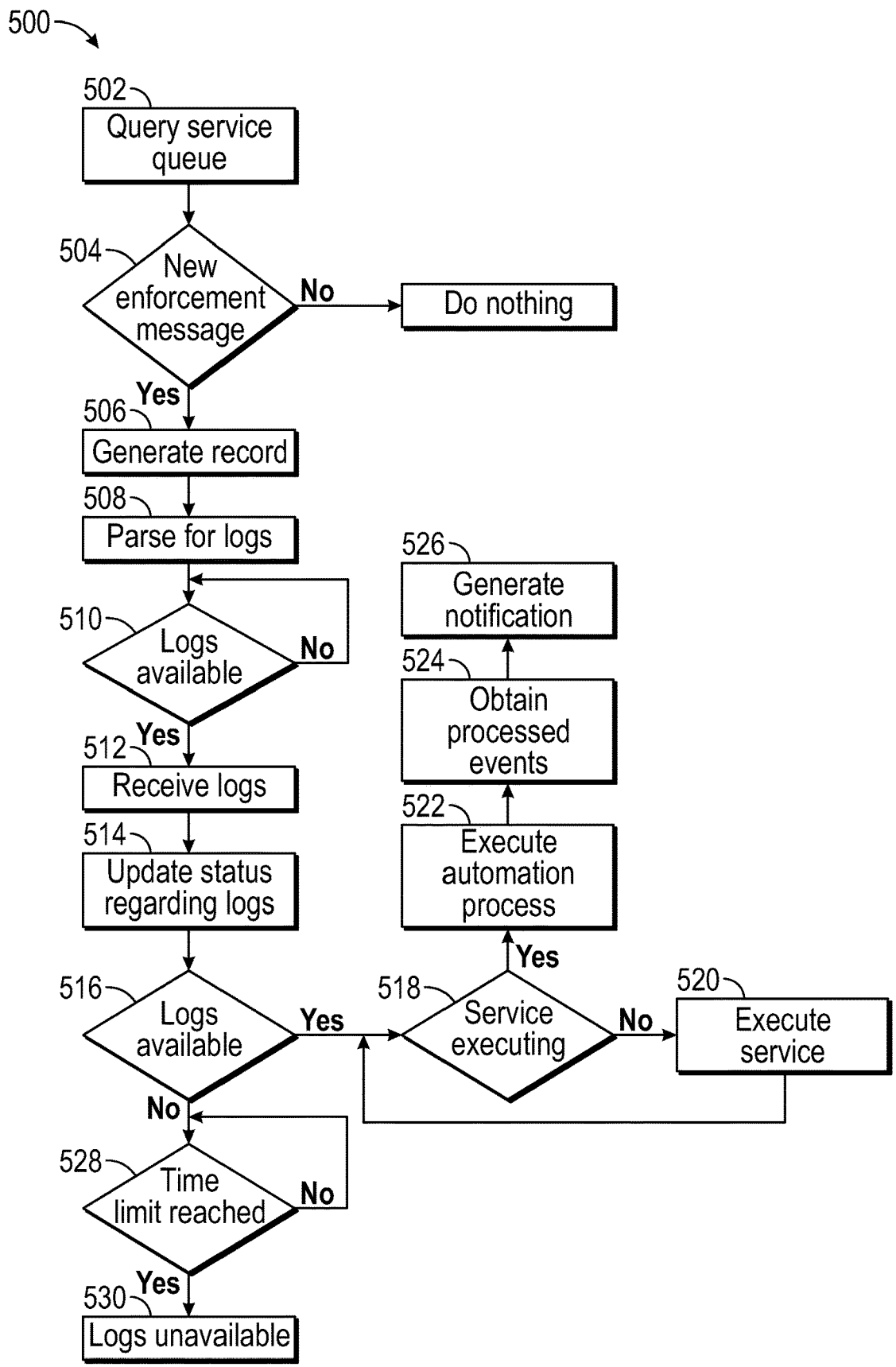
FIG. 5 illustrates a flowchart exemplifying watchdog control logic, in accordance with one or more embodiments of the present disclosure.

FIG. 5 illustrates a flowchart exemplifying watchdog control logic 500, in accordance with one or more embodiments of the present disclosure. The watchdog control logic 500 can be implemented as an algorithm on a server 102, a machine learning module, a client, a database, or other suitable system. Additionally, the watchdog control logic 500 can implement or incorporate one or more features of the watchdog system 204, including log download module 116, automation initializing module 118, and automation workflow module 120. The watchdog control logic 500 can be achieved with software, hardware, an API, a network connection, a network transfer protocol, HTML, DHTML, JavaScript, Dojo, Ruby, Rails, other suitable applications, or a suitable combination thereof.

The watchdog control logic 500 can leverage the ability of a computer platform to spawn multiple processes and threads by processing data simultaneously. The speed and efficiency of the watchdog control logic 500 can be greatly improved by instantiating more than one process to implement detaching partitioned data. However, one skilled in the art of programming will appreciate that use of a single processing thread may also be utilized and is within the scope of the present disclosure.

In one embodiment, commands or data can be received via user input generated on a client or server, such as a screen tap, swipe, mouse click, key press, voice command, or other suitable mechanism. In another embodiment, the inspection commands or data can include inspection data having one or more fields, parameters, characteristics, or metadata, related to an inspection. The watchdog control logic 500 then proceeds to step 502.

At step 502, in one embodiment, the control logic 500 can query an internal service queue. For example, the internal service queue can be located at an IP address. In another example, the control logic 500 can query the internal service queue at a specified frequency. In another example, the specified frequency can include a user-set value, or a scheduled frequency. In another example, the scheduled frequency can include an execution every six minutes. The control logic 500 proceeds to step 504.

At step 504, in one embodiment, the control logic 500 can determine whether the internal service queue includes a new enforcement message. For example, the new enforcement message can correspond to a new enforcement event. In another example, the control logic 500 can prompt the internal service queue to notify the control logic 500 of any updated enforcement messages. If the internal service queue includes a new enforcement message, the control logic 500 proceeds to step 506. If the internal service queue lacks a new enforcement message, the control logic 500 proceeds to do nothing.

At step 506, in one embodiment, the control logic 500 can generate a record. For example, the record can include a collection of enforcement events based on enforcement messages from the internal service queue. In another example, the control logic 500 can store the record to another database. The control logic 500 proceeds to step 508.

At step 508, in one embodiment, the control logic 500 can parse a file retrieval system for train system logs corresponding to the new enforcement event. For example, the file retrieval system can include the FRM. In another example, the train system logs can include downloadable files. The control logic 500 proceeds to step 510.

At step 510, in one embodiment, the control logic 500 can determine whether the train system logs are available. For example, the control logic 500 can determine whether the train system logs are available in the file retrieval system. In another example, the train system logs might not be generated at a time the control logic 500 checks, as the train system logs can lag. If the train system logs are unavailable, then the control logic 500 repeats step 510 after a period of time. For example, the period of time can be 49 hours. If the train system logs are available, then the control logic 500 proceeds with step 512.

At step 512, in one embodiment, the control logic 500 can receive the train system logs. For example, the control logic 500 can receive the train system logs from the file retrieval system. In another example, the control logic 500 can receive the train system logs in a downloadable manner. In another example, the control logic 500 can receive the train system logs in a virtual manner, such as a cloud environment. The control logic 500 proceeds with step 514.

At step 514, in one embodiment, the control logic 500 can update a status of the train system logs in the record. For example, the control logic 500 can update the record to indicate whether the train system logs were available or not. The control logic 500 proceeds with step 516.

At step 516, in one embodiment, the control logic 500 can determine whether the logs are available. For example, the control logic 500 can determine whether the train system logs include information for a plurality of CPUs on the train. If the logs are available, the control logic 500 proceeds to step 518. If the logs are unavailable, the control logic 500 proceeds to step 528.

At step 518, in one embodiment, the control logic 500 can determine whether an automation service is currently executing. For example, the control logic 500 can determine whether the automation service is executing on a designated server. In another example, the designated server can include a designated IP address. If the automation service is not currently executing, the control logic 500 can proceed to step 520. If the automation service is currently executing, the control logic 500 can proceed to step 522.

At step 520, in one embodiment, the control logic 500 can execute the automation service. For example, the control logic 500 can execute the automation service by executing initialization instructions for the automation service. The control logic 500 proceeds with step 518.

At step 522, in one embodiment, the control logic 500 can execute an automation process. For example, the automation process can include algorithms, applications, and functions from the automated production system 206. In another example, the algorithms, applications, and functions can include one or more of the extraction module 122, the analysis module 124, the event watch module 126, and the automation production module 128. In another example, the control logic 500 can execute the automation process by executing initialization instructions for the automation process. The control logic 500 proceeds with step 522.

At step 524, in one embodiment, the control logic 500 can receive processed events. For example, the processed events can include results from the automated process. In another example, the processed events can include a root cause of the enforcement event. In another example, the control logic 500 can receive the processed events from the designated server. In another example, the control logic 500 can store the processed events to automation production server. The control logic 500 proceeds with step 526.

At step 526, in one embodiment, the control logic 500 can generate a notification. For example, the notification can correspond to a result of the processed events. In another example, the control logic 500 can generate the notification for a group of stakeholders of the processed events. In another example, the control logic 500 transmits the notification to the stakeholders via email. In one embodiment, the control logic 500 can transmit event files to a completed directory. For example, the event files can include information regarding the processed events. In another example, the completed directory can include a file server specific to the processed events.

At step 528, in one embodiment, the control logic 500 can determine whether the time limit is reached. For example, the time limit can be 49 hours from when step 516 was completed. If the time limit has not expired, the control logic 500 proceeds to repeat step 526 until the time limit expires. If the time limit has expired, the control logic 500 proceeds to step 528.

At step 530, in one embodiment, the control logic 500 can update the status to indicate the train system logs are unavailable.

Figure 6:
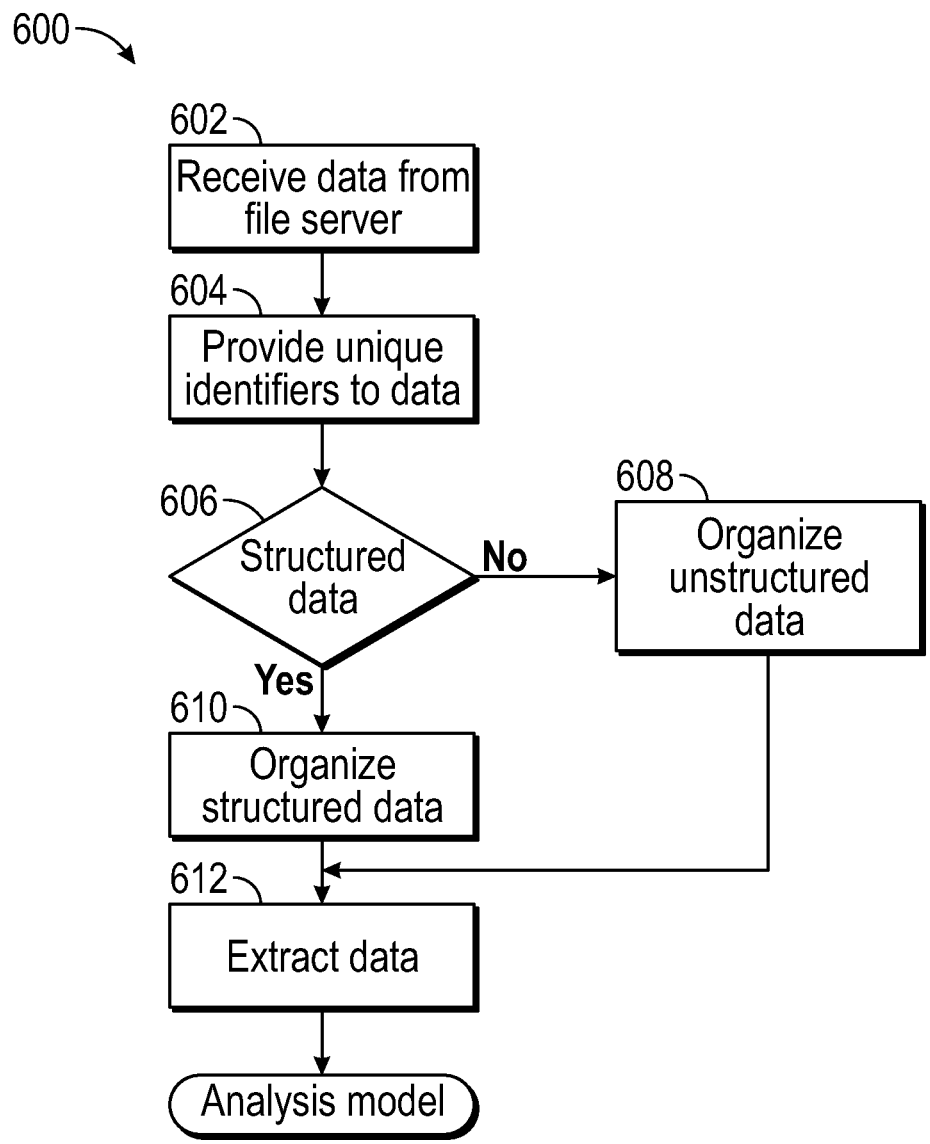
FIG. 6 illustrates a flowchart exemplifying data extraction control logic, in accordance with one or more embodiments of the present disclosure.

FIG. 6 illustrates a flowchart exemplifying data extraction control logic 600, in accordance with one or more embodiments of the present disclosure. The data extraction control logic 600 can be implemented as an algorithm on a server 102, a machine learning module, a client, a database, or other suitable system. Additionally, the data extraction control logic 600 can implement or incorporate one or more features of the automated production system 206, including extraction module 122, analysis module 124, event watch module 126, and automation production module 128. The data extraction control logic 600 can be achieved with software, hardware, an API, a network connection, a network transfer protocol, HTML, DHTML, JavaScript, Dojo, Ruby, Rails, other suitable applications, or a suitable combination thereof.

The data extraction control logic 600 can leverage the ability of a computer platform to spawn multiple processes and threads by processing data simultaneously. The speed and efficiency of the data extraction control logic 600 can be greatly improved by instantiating more than one process to implement deleting partitioned data. However, one skilled in the art of programming will appreciate that use of a single processing thread may also be utilized and is within the scope of the present disclosure.

In one embodiment, commands or data can be received via user input generated on a client or server, such as a screen tap, swipe, mouse click, key press, voice command, or other suitable mechanism. In another embodiment, the inspection commands or data can include inspection data having one or more fields, parameters, characteristics, or metadata, related to an inspection. The data extraction control logic 600 then proceeds to step 602.

At step 602, in one embodiment, the control logic 600 can receive data from a file server. For example, the data corresponds to train system logs of enforcement events. In another example, the train system logs can include characteristics of the enforcement events, such as an event time, a primary CPU monitoring the train during the enforcement, an appropriate component software version, a high-level system health scan, among other relevant information. In another example, the control logic 600 can collect data surrounding a time of one the enforcement events to generate a time window. For example, the data can correspond with the train system logs. In another example, the time window can include time measurements before one or more of the enforcement events, after the enforcement event, or both before and after the enforcement event. In another example, the time window can include seconds, minutes, or hours around one or more of the enforcement events. In another example, the control logic 600 can compare the time of one of the enforcement events with the data to verify the enforcement event actually occurred. The control logic 600 proceeds to step 604.

At step 604, in one embodiment, the control logic 600 can provide unique identifiers to the data. For example, the unique identifier can correspond with the characteristics of the train system logs. The control logic 600 proceeds to step 606.

At step 606, in one embodiment, the control logic 600 can determine whether the data is structured. For example, the data can be structured when information in the data can be classified according to a predetermined manner. In another example, the data can be unstructured when the information in the data can be classified differently than the predetermined manner or unclassified entirely. If the data is unstructured, the control logic 600 proceeds to step 608. If the data is structured, the control logic 600 proceeds to step 610.

At step 608, in one embodiment, the control logic 600 can organize the unstructured data. For example, the control logic 600 can identify a pattern to the unstructured data to transform the data into structured data. In another example, the control logic 600 can transform the unstructured data into structured data using a data transformation software tool. In another example, the control logic 600 can organize the unstructured data to transform the unstructured data to structured based on various factors. In another example, the factors can include message length, message payload, an employee name, an employee ID, an employee role on the train, the enforcement type, a location of the train, among other relevant information. The control logic 600 proceeds to step 610.

At step 610, in one embodiment, the control logic 600 can organize the structured data. For example, the control logic 600 can organize the structured data based on various factors of the data. In another example, the factors can include message length, message payload, an employee name, an employee ID, an employee role on the train, the enforcement type, a location of the train, among other relevant information. The control logic proceeds to step 612.

At step 612, in one embodiment, the control logic 600 can extract data. For example, the control logic 600 can extract data using regular expression. In another example, the regular expressions can include a sequence of characters that define a search pattern. In another example, the control logic 600 can extract data using data manipulation techniques. In another example, the data manipulation techniques can include using commercial software tools such as HADOOP® or custom data tools. In another embodiment, the control logic 600 transmits the extracted data to an analysis model.

Figure 7:
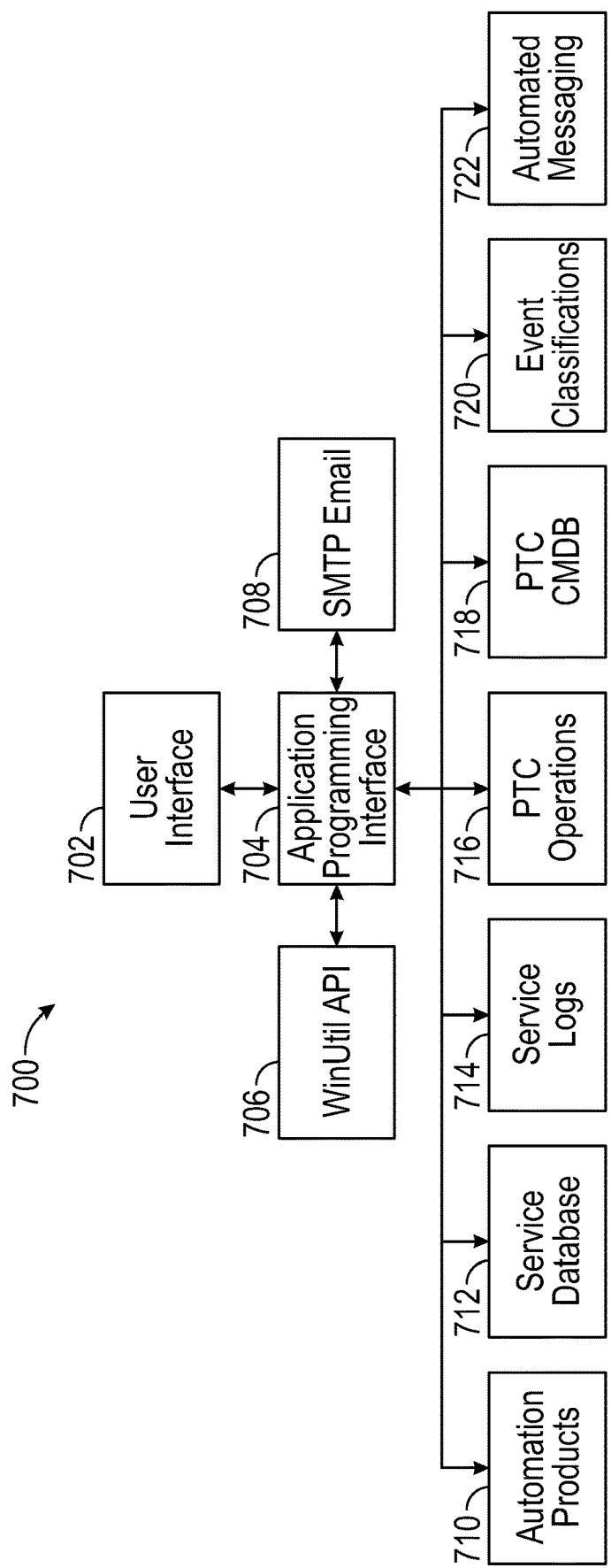
FIG. 7 illustrates a block diagram of an automated workflow system interface, in accordance with one or more embodiments of the present disclosure.

FIG. 7 illustrates an exemplary block diagram of an automated workflow system interface 700, in accordance with one or more embodiments of the present disclosure. In one embodiment, a user interface 702 can be displayed on a client. For example, a client can display one or more icons to select a plurality of actions including an event analysis, statistics of events, event search for a brake event, among other relevant actions. In another example, the event analysis can include a brake event search function, which can search collected information regarding brake events to display any of the collected information. In another embodiment, a backend of the automated workflow system interface 700 can include an API 704, a WINUTIL API 706, a simple mail transfer protocol (SMTP) email interface 708, an automation products database 710, a service database 712, a service logs database 714, a PTC operations database 716, a PTC configuration management database (CMDB) 718, an event classifications database 720, and an automated messaging database 722. In another embodiment, the API 704 can communicate, via a network, with the WINUTIL API 706, the SMTP email interface 708, the automation products database 710, the service database 712, the service logs database 714, the PTC operations database 716, the PTC CMDB 718, the event classifications database 720, and the automated messaging database 722. For example, the network can include the network 140 from FIG. 1.

FIG. 8 illustrates an embodiment of an automated workflow system interface, in accordance with one or more embodiments of the present disclosure. With regard to FIG. 8, there is shown an automated workflow system (dashboard) screen 800. In one embodiment, the automated workflow system screen 800 can include one or more icons that can instantiate one or more processes or algorithms. An icon can include text, an image, and/or a software object. For example, the automated workflow system screen 800 can include a Home icon 802, an Event Analysis icon 804, a Stats icon 806, an Event Reclassification icon 808, a Close-out Dashboard icon 810, and an Event Profile icon 812, among other relevant icons. In another embodiment, the automated workflow system screen 800 can include a search function 814 to perform a search of event information collected in a plurality of databases based on an input. For example, the search function 814 can include, based on the input, a listing of brake events occurring in an identified date range, among other relevant categories. In another example, the search function 814 can filter search results according to one or more subdivisions corresponding to the event information. In another example, the search function 814 can display the event information in a web-based interface.

Figure 9:
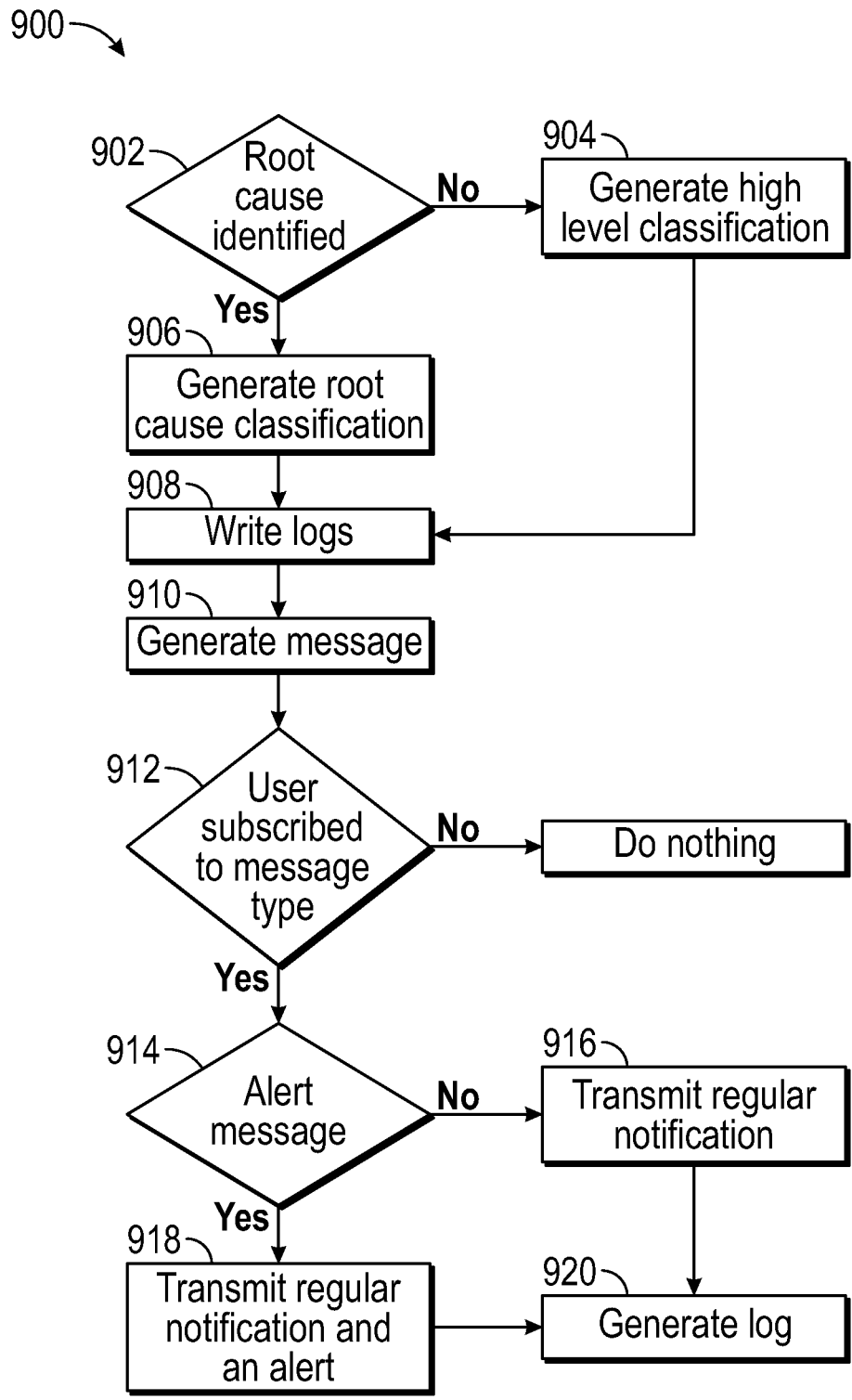
FIG. 9 illustrates a flowchart exemplifying termination control logic, in accordance with one or more embodiments of the present disclosure.

FIG. 9 illustrates a flowchart exemplifying termination control logic 900, in accordance with one or more embodiments of the present disclosure. The termination control logic 900 can be implemented as an algorithm on a server 102, a machine learning module, a client, a database, or other suitable system. Additionally, the termination control logic 900 can implement or incorporate one or more features of the automated workflow system 200, including the file retrieval management system 202, watchdog system 204, and automated production system 206. The termination control logic 900 can be achieved with software, hardware, an API, a network connection, a network transfer protocol, HTML, DHTML, JavaScript, Dojo, Ruby, Rails, other suitable applications, or a suitable combination thereof.

The termination control logic 900 can leverage the ability of a computer platform to spawn multiple processes and threads by processing data simultaneously. The speed and efficiency of the termination control logic 900 can be greatly improved by instantiating more than one process to implement data lifecycle management. However, one skilled in the art of programming will appreciate that use of a single processing thread may also be utilized and is within the scope of the present disclosure.

In one embodiment, commands or data can be received via user input generated on a client or server, such as a screen tap, swipe, mouse click, key press, voice command, or other suitable mechanism. In another embodiment, the inspection commands or data can include inspection data having one or more fields, parameters, characteristics, or metadata, related to an inspection. The termination control logic 900 then proceeds to step 902.

At step 902, in one embodiment, the control logic 900 can identify whether a root cause was determined. For example, the control logic 900 can receive an analysis result to identify whether the root cause was determined. In another example, the root cause was determined by an analysis model, such as described as an analysis module 124 in FIG. 2. In another embodiment, when the analysis result includes the root cause, the control logic 900 can assign an alert ID to the analysis result. If the root cause was not determined, the control logic 900 proceeds to step 904. If the root cause was determined, the control logic 900 proceeds to step 906.

At step 904, in one embodiment, the control logic 900 can generate a high-level classification. For example, the high-level classification can correspond to an enforcement event. In another example, when the analysis result does not include the root cause, the control logic 900 can generate the high-level classification for the enforcement event and assign a unique ID to the analysis result. For example, the high-level classification can include a message type, a message description, and a banner. In another example, the message type can be a warning to the train prior to an enforcement event. In another example, the message description can include a description of the warning including information such as the enforcement event. In another example, the banner can be the last banner shown to the engineer prior to the enforcement event. The control logic 900 then proceeds to step 908.

At step 906, in one embodiment, the control logic 900 can generate a root cause classification. For example, the control logic 900 can generate a detailed synopsis. In another example, the detailed synopsis can include a plurality of events such as a time that a train was active, a speed of the train during the enforcement of the train event, location details of the train, warnings to the train, configuration details of the train, PTC component information, a type of the enforcement, and a type of braking event. In another example, the detailed synopsis can correspond to the unique ID or the alert ID. The control logic 900 then proceeds to step 908.

At step 908, in one embodiment, the control logic 900 can write to an automation service address. For example, the automation service address can include an IP address to receive a plurality of automation logs. In another example, the automation logs can include the GUID of the enforcement event and the enforcement event. The control logic 900 proceeds to step 910.

At step 910, in one embodiment, the control logic 900 can generate a message to send to at least one user. For example, the message can include information regarding the root cause of the enforcement event. The control logic 900 proceeds to step 912.

At step 912, in one embodiment, the control logic 900 can determine whether the at least one user subscribed to a particular message type. For example, the control logic 900 can determine whether the at least one user subscribed to the particular message type based on a listsery of users. In another example, the particular message type can be an email, SMS, direct message, or another type of message type. If the at least one user does not subscribe to the particular message type, the control logic 900 proceeds to do nothing. If the at least one user does subscribe to the particular message type, the control logic 900 then proceeds to step 914.

At step 914, in one embodiment, the control logic 900 can determine whether the message is an alert message. If the message is not the alert message, the control logic 900 proceeds to step 916. If the message is the alert message, the control logic 900 then proceeds to step 918.

At step 916, in one embodiment, the control logic 900 can transmit the message as a regular notification. For example, the control logic 900 can transmit the message using the particular message type. The control logic 900 proceeds to step 920.

At step 918, in one embodiment, the control logic 900 can transmit the message as a regular notification and the alert message. The control logic 900 proceeds to step 920.

At step 920, in one embodiment, the control logic 900 can generate a log. For example, the log can include a history of data regarding regular notifications and alert messages. In another example, the control logic 900 can transmit an email to generate the history of the data in the log.

Figure 10:
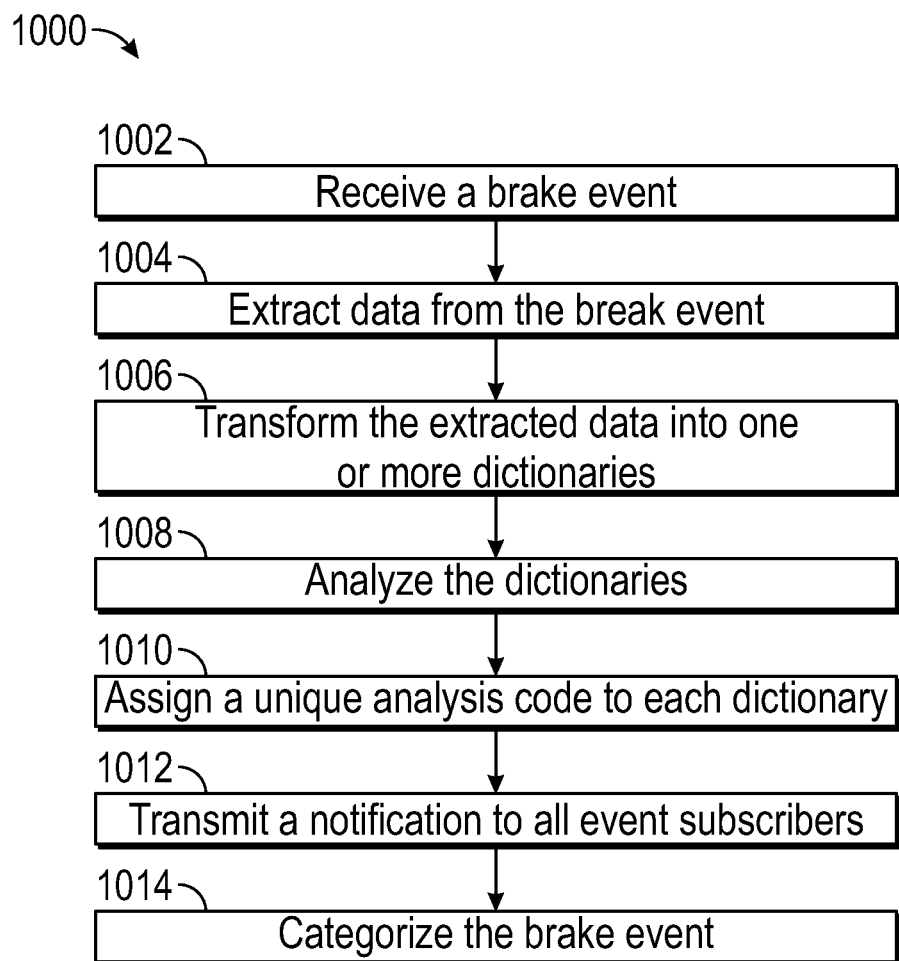
FIG. 10 illustrates a flowchart exemplifying brake event handling control logic, in accordance with one or more embodiments of the present disclosure.

FIG. 10 illustrates a flowchart exemplifying brake event handling control logic 1000, in accordance with one or more embodiments of the present disclosure. The brake event handling control logic 1000 can be implemented as an algorithm on a server 102, a machine learning module, a client, a database, or other suitable system. Additionally, the brake event handling control logic 1000 can implement or incorporate one or more features of the automated workflow system 200, including the file retrieval management system 202, watchdog system 204, and automated production system 206. The brake event handling control logic 1000 can be achieved with software, hardware, an API, a network connection, a network transfer protocol, HTML, DHTML, JavaScript, Dojo, Ruby, Rails, other suitable applications, or a suitable combination thereof.

The brake event handling control logic 1000 can leverage the ability of a computer platform to spawn multiple processes and threads by processing data simultaneously. The speed and efficiency of the brake event handling control logic 1000 can be greatly improved by instantiating more than one process to implement brake event handling. However, one skilled in the art of programming will appreciate that use of a single processing thread may also be utilized and is within the scope of the present disclosure.

In one embodiment, commands or data can be received via user input generated on a client or server, such as a screen tap, swipe, mouse click, key press, voice command, or other suitable mechanism. In another embodiment, the inspection commands or data can include inspection data having one or more fields, parameters, characteristics, or metadata, related to an inspection. The brake event handling control logic 1000 then proceeds to step 1002.

At step 1002, in one embodiment, the control logic 1000 can receive a brake event. For example, the control logic 1000 can receive the brake event from a PTC system. In another example, the control logic 1000 can receive incoming messages regarding railroad event notifications, such as a PTC brake event. In another example, the control logic 1000 can receive the incoming messages from a FRM. For example, the incoming messages can correspond to enforcement of a brake event applied to a train. In another embodiment, the control logic 1000 can transmit outgoing messages to the FRM. For example, the outgoing messages can request train system logs corresponding to the enforcement of the brake event. In another embodiment, the file collection module 108 can receive a notification from the FRM indicating the train system logs are available. The control logic 1000 proceeds to step 1004.

At step 1004, in one embodiment, the control logic 1000 can extract data from the brake event. For example, the data can correspond to the train system logs indicating the characteristics of the enforcement event. In another example, the file server can include train system logs from a plurality of enforcement events. In another embodiment, the control logic 1000 can collect data surrounding a time of the enforcement event to generate a time window. For example, the data can correspond with the train system logs. In another example, the time window can include time measurements before the enforcement event, after the enforcement event, or both before and after the enforcement event. In another example, the time window can include seconds, minutes, or hours around the enforcement event. In another example, the control logic 1000 can compare the time of the enforcement with the data to verify the enforcement event actually occurred. The control logic 1000 proceeds to step 1006.

At step 1006, in one embodiment, the control logic 1000 can transform the extracted data into one or more dictionaries. For example, the dictionaries can include a predetermined format. In another embodiment, the control logic 1000 can determine whether the data is structured. For example, the data can be structured when information in the data can be classified according to a predetermined manner. In another example, the data can be unstructured when the information in the data can be classified differently than the predetermined manner or unclassified entirely. In another embodiment, when the data is unstructured, the control logic 1000 can identify a pattern to the unstructured data to transform the data into structured data and extract the data. For example, the control logic 1000 can transform the unstructured data into structured data using a data transformation software tool. In another embodiment, when the data is structured, the control logic 1000 can extract the data. In another example, the control logic 1000 can extract data using regular expression. In another example, the regular expressions can include a sequence of characters that define a search pattern. In another example, the control logic 1000 can extract data using data manipulation techniques. In another example, the data manipulation techniques can include using commercial software tools such as HADOOP® or custom data tools. The control logic 1000 proceeds to step 1008.

At step 1008, in one embodiment, the control logic 1000 can analyze the dictionaries. For example, the dictionaries can include whether the control logic 1000 determined a cause of the brake event. In another example, the control logic 1000 can include a plurality of decision steps to determine the cause. In another example, the control logic 1000 can identify the cause of the brake event using training data model. In another example, the training data models can include user-based parameters. In another example, the training data can include live or historical data. In another example, the live data can include real-time information that is monitored for anomalous behavior. In another example, the historical data can include a dataset of prior events that can be used to classify brake events. In another embodiment, the control logic 1000 can analyze the dictionaries using a defect detection analysis model. In another example, the defect detection analysis model identifies when a defect during the analysis occurs. In another example, when the defect occurs, the control logic 1000 classifies the defect as the root cause. In another example, when the defect does not occur, the control logic 1000 can analyze the dictionaries using a historical analysis model. In another example, the historical analysis model can be based on historical data such as previous engineer interactions, system component responses, and situational behavior. In another example, the control logic 1000 can analyze the extracted data using a decision tree model, a classification model, or a clustering model. For example, the control logic 1000 can analyze the dictionaries via a machine learning module. The control logic 1000 proceeds to step 1010.

At step 1010, in one embodiment, the control logic 1000 can assign a unique analysis code to each dictionary. For example, when the dictionaries do not include the cause of the brake event, the control logic 1000 can generate the unique analysis code as a high-level classification for the cause of the brake event and assign a unique ID to the dictionaries. For example, the high-level classification can include a message type, a message description, and a banner. In another example, the message type can be a warning to the train prior to an enforcement event. In another example, the message description can include a description of the warning including information such as the enforcement event. In another example, the banner can be the last banner shown to the engineer prior to the enforcement event. In another embodiment, when the dictionaries include the cause of the brake event, the control logic 1000 can assign an alert ID to the dictionaries. The control logic 1000 proceeds to step 1012.

At step 1012, in one embodiment, the control logic 1000 can transmit a notification to all event subscribers. For example, the control logic 1000 can transmit a detailed synopsis to the event subscribers. For example, the detailed synopsis can include a plurality of events such as a time that a train was active, a speed of the train during the enforcement of the train event, location details of the train, warnings to the train, configuration details of the train, PTC component information, a type of the enforcement, and a type of braking event. In another example, the detailed synopsis can correspond to the unique ID or the alert ID. In another example, the control logic 1000 can transmit the detailed synopsis through an AES. In another example, the AES can include a listsery of all event subscribers to be notified. In another embodiment, the control logic 1000 can generate an output and distribute a notification based on a subscriber list. The control logic 1000 proceeds to step 1014.

At step 1014, in one embodiment, the control logic 1000 can categorize the brake event. For example, the control logic 1000 can classify the brake event as one of a plurality of events corresponding to the cause of the brake event. In another example, the control logic 1000 can categorize the brake event based on the train system logs and the characteristics. In another example, the control logic 1000 can categorize the brake event based on the extracted data. In another embodiment, the control logic 1000 can categorize the brake event and store information corresponding to the brake event in a designated server.

The present disclosure achieves at least the following advantages:

1. performs data extraction and root cause analysis for various types of data structures using an automated engine;
2. increases efficiency of inspectors performing the root cause analysis by automating workflow;
3. enables accurate detection of train events such as PTC brake events and identifies the root cause of such events; and
4. provides an analytical framework to perform root cause analysis using data extraction and analysis models.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A system for extracting data and performing root cause analysis of data structures, comprising:
    a memory having a database with train system logs; and
    a processor operably coupled to the memory and capable of executing machine-readable instructions to perform program steps, the program steps comprising:
        receiving a message having message data corresponding to train policy enforcement events;
        determining whether the message data is unstructured;
        transforming unstructured message data to structured data using one or more factors;
        organizing the structured data according to one or more of the factors;
        extracting data from the structured data;
        analyzing the extracted data using an analysis model to generate an analysis result;
        assigning, via the analysis model, an alert ID to the analysis result; and
        sending a synopsis corresponding to the unique ID or the alert ID to a user.

2. The system of claim 1, wherein the factors include message length, message payload, an employee name, an employee ID, an employee role on the train, the policy enforcement type, a location of the train.

3. The system of claim 1, the program steps further comprising:
    creating, via the analysis model, a high-level classification for the train event, if the analysis result does not include the root cause.

4. The system of claim 1, the program steps further comprising:
    analyzing the extracted data using a defect detection analysis model;
    if a defect is detected, classifying the root cause as the defect; and
    if the defect is not detected, analyzing the extracted data using a historical analysis model.

5. The system of claim 4, wherein the historical analysis model is based on historical data such as previous engineer interactions, system component responses, and situational behavior.

6. The system of claim 1, wherein either structured data or unstructured data include train system log data.

7. The system of claim 6, wherein the data is extracted using data manipulation practices.

8. The system of claim 1, wherein the analysis model comprises a decision tree model, a classification model, or a clustering model.

9. The system of claim 1, wherein the data is extracted using a regular expression.

10. The system of claim 9, wherein the regular expression includes a sequence of characters that define a search pattern.

11. A method of extracting data and performing root cause analysis of data structures, comprising:
    receiving a message having message data corresponding to train policy enforcement events;
    determining whether the message data is unstructured;
    transforming unstructured message data to structured data using one or more factors;
    organizing the structured data according to one or more of the factors;
    extracting data from the structured data;
    analyzing the extracted data using an analysis model to generate an analysis result;
    assigning, via the analysis model, an alert ID to the analysis result; and
    sending a synopsis corresponding to the unique ID or the alert ID to a user.

12. The method of claim 11, wherein the factors include message length, message payload, an employee name, an employee ID, an employee role on the train, the policy enforcement type, a location of the train.

13. The method of claim 11, further comprising:
    creating, via the analysis model, a high-level classification for the train event, if the analysis result does not include the root cause.

14. The method of claim 11, further comprising:
    analyzing the extracted data using a defect detection analysis model;
    if a defect is detected, classifying the root cause as the defect; and
    if the defect is not detected, analyzing the extracted data using a historical analysis model.

15. The method of claim 14, wherein the historical analysis model is based on historical data such as previous engineer interactions, system component responses, and situational behavior.

16. The method of claim 11, wherein either structured data or unstructured data include train system log data.

17. The method of claim 16, wherein the data is extracted using data manipulation practices.

18. The method of claim 11, wherein the analysis model comprises a decision tree model, a classification model, or a clustering model.

19. The method of claim 11, wherein the data is extracted using a regular expression.

20. The method of claim 19, wherein the regular expression includes a sequence of characters that define a search pattern.

* * * * *